(12) United States Patent
Kunioka et al.

(10) Patent No.: US 9,081,432 B2
(45) Date of Patent: Jul. 14, 2015

(54) DISPLAY DEVICE WITH TOUCH PANEL

(71) Applicants: Jun Kunioka, Okazaki (JP); Taketoshi Yamahata, Toyokawa (JP); Takao Kurohata, Hino (JP); Shoko Haba, Toyokawa (JP); Ryosuke Nishimura, Toyokawa (JP)

(72) Inventors: Jun Kunioka, Okazaki (JP); Taketoshi Yamahata, Toyokawa (JP); Takao Kurohata, Hino (JP); Shoko Haba, Toyokawa (JP); Ryosuke Nishimura, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 341 days.

(21) Appl. No.: 13/753,907

(22) Filed: Jan. 30, 2013

(65) Prior Publication Data
US 2013/0201132 A1 Aug. 8, 2013

(30) Foreign Application Priority Data
Feb. 2, 2012 (JP) .................................. 2012-021036

(51) Int. Cl.
*G06F 3/041* (2006.01)
*G06F 3/0488* (2013.01)
*H04N 1/00* (2006.01)
(Continued)

(52) U.S. Cl.
CPC ............ *G06F 3/041* (2013.01); *G06F 3/04886* (2013.01); *G06F 21/35* (2013.01); *G06F 21/608* (2013.01); *H04N 1/00411* (2013.01); *H04N 1/00453* (2013.01); *H04N 1/00456* (2013.01); *H04N 1/00472* (2013.01); *H04N 1/00474* (2013.01); *H04N 1/00482* (2013.01); *H04N 1/00514* (2013.01); *H04N 1/4413* (2013.01); *H04N 1/4433* (2013.01)

(58) Field of Classification Search
CPC ..... G06F 3/041; G06F 3/04886; G06F 21/35; G06F 21/608; H04N 1/00411; H04N 1/00453; H04N 1/00456; H04N 1/00472; H04N 1/00474; H04N 1/00482; H04N 1/00514; H04N 1/4413; H04N 1/4433
See application file for complete search history.

(56) References Cited

U.S. PATENT DOCUMENTS

2008/0229211 A1* 9/2008 Herberger et al. ............ 715/744
2009/0244618 A1 10/2009 Yamaji et al.
(Continued)

FOREIGN PATENT DOCUMENTS

JP 20000222092 A 8/2000
JP 2009-244725 A 10/2009
(Continued)

OTHER PUBLICATIONS

Japanese Office Action (Notice of Allowance) dated Jan. 21, 2014, issued in Japanese Patent Application No. 2012-021036 with an English translation thereof. (5 pgs.).

*Primary Examiner* — Michael Pyzocha
(74) *Attorney, Agent, or Firm* — Buchanan Ingersoll & Rooney PC

(57) ABSTRACT

An MFP (Multi-Functional Peripheral) includes a display device with a touch panel for displaying a variety of information. A plurality of screens including a base screen and a pop-up screen overlapping one another are displayed on the touch panel. The MFP accepts operation on any one of the screens and identifies the user who performs the accepted operation. If the identified user does not have operation authority over the pop-up screen, the MFP does not specify the pop-up screen as a screen serving as a target of the operation but specifies the base screen as a screen serving as a target of the operation.

19 Claims, 32 Drawing Sheets

(51) Int. Cl.
*H04N 1/44* (2006.01)
*G06F 21/35* (2013.01)
*G06F 21/60* (2013.01)

(56) References Cited

U.S. PATENT DOCUMENTS

2009/0316186 A1  12/2009  Higashi et al.
2010/0162410 A1*  6/2010  Chudy et al. .................. 726/27
2010/0211872 A1*  8/2010  Rolston et al. ................ 715/702
2010/0265204 A1*  10/2010  Tsuda ........................... 345/174
2010/0277763 A1  11/2010  Aoyama et al.
2014/0173721 A1*  6/2014  Shenfield et al. ............... 726/21

FOREIGN PATENT DOCUMENTS

| | | |
|---|---|---|
| JP | 2010002999 A | 1/2010 |
| JP | 2010-262454 A | 11/2010 |
| JP | 2010-286895 A | 12/2010 |

* cited by examiner

FIG.7
(a)
| OBJECT ID | OBJECT NAME | COORDINATE POSITION | | | | PRESENTATION OF POP-UP DISPLAY |
|---|---|---|---|---|---|---|
| | | A | B | C | D | |
| | LAYER 1 | | | | | |
| 1.1 | PREVIEW 1 | (8,16) | (120,16) | (120,80) | (8,80) | NO |
| 1.2 | PREVIEW 2 | (140,16) | (252,16) | (252,80) | (140,80) | NO |
| 1.3 | MESSAGE AREA | (0,-40) | (280,-40) | (280,0) | (0,0) | NO |
| 1.4 | SETTING KEY 1 | (6,100) | (46,100) | (46,120) | (6,120) | YES |
| 1.5 | SETTING KEY 2 | (60,100) | (100,100) | (100,120) | (60,120) | YES |
| 1.6 | SETTING KEY 3 | (114,100) | (154,100) | (154,120) | (114,120) | YES |
| 1.7 | SETTING KEY 4 | (168,100) | (208,100) | (208,120) | (168,120) | YES |
(b)
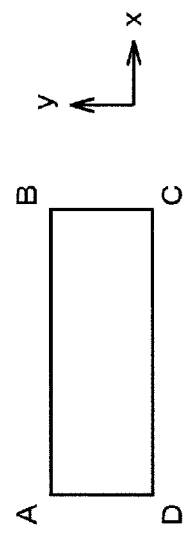
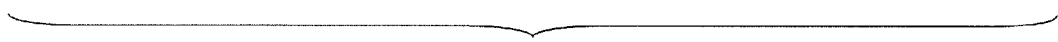

FIG.8

| OBJECT ID | OBJECT NAME | COORDINATE POSITION | | | | PRESENTATION OF POP-UP DISPLAY |
|---|---|---|---|---|---|---|
| | | A | B | C | D | |
| | LAYER 1 | | | | | |
| 1.1 | PREVIEW 1 | (8,16) | (120,16) | (120,80) | (8,80) | NO |
| 1.2 | PREVIEW 2 | (140,16) | (252,16) | (252,80) | (140,80) | NO |
| 1.3 | MESSAGE AREA | (0,-40) | (280,-40) | (280,7) | (0,0) | NO |
| 1.4 | SETTING KEY 1 | (6,100) | (46,100) | (46,120) | (6,120) | YES |
| 1.5 | SETTING KEY 2 | (60,100) | (100,100) | (100,120) | (60,120) | YES |
| 1.6 | SETTING KEY 3 | (114,100) | (154,100) | (154,120) | (114,120) | YES |
| 1.7 | SETTING KEY 4 | (168,100) | (208,100) | (208,120) | (168,120) | YES |
| | LAYER 2 | | | | | |
| ...... | ...... | ...... | ...... | ...... | ...... | ...... |

FIG.9

| LAYER | STATUS | OPERATION AUTHORITY |
|---|---|---|
| LAYER 1 | IN USE | USER A, USER B, USER C |
| LAYER 2 | NOT IN USE | — |
| LAYER 3 | NOT IN USE | — |
| LAYER 4 | NOT IN USE | — |
| LAYER 5 | NOT IN USE | — |

FIG.10

| LAYER | STATUS | OPERATION AUTHORITY |
|---|---|---|
| LAYER 1 | IN USE | USER A, USER B, USER C |
| LAYER 2 | IN USE | USER A |
| LAYER 3 | NOT IN USE | — |
| LAYER 4 | NOT IN USE | — |
| LAYER 5 | NOT IN USE | — |

DISPLAY DEVICE WITH TOUCH PANEL

This application is based on Japanese Patent Application No. 2012-21036 filed with the Japan Patent Office on Feb. 2, 2012, the entire content of which is hereby incorporated by reference.

BACKGROUND OF THE INVENTION

1. Field of the Invention

The present invention relates to a display device, and more particularly to a display device with improved operability.

2. Description of the Background Art

Today, image forming apparatuses including multi-functional peripherals are equipped with touch panel-type operation panels. Users can perform input operation to image forming apparatuses by touching keys displayed on the touch panels.

As a technique concerning touch panels, a technique for identifying a user whose operation is accepted is proposed. For example, Document 1 below discloses an information input apparatus including display means, input means provided on a display region of the display means, and body area network means using an upper surface of a protective layer of the input means as a touch panel surface for communication with an external device held by the operator through the operator's human body. According to the technique in Document 1 below, every time the information input apparatus accepts touch input operation, the user who performs the touch operation is identified thereby enabling a process allocated to an object.

Document 2 below discloses a print order apparatus in which a plurality of users can select their own images simultaneously and suitably with a single apparatus. When accepting a touch on a display portion of an image that each of a plurality of users wants to print, the print order apparatus detects the operation on the touch panel and identifies the user who performs the operation, using a user identifying sensor. Then, the image is specified to be printed as the user's print order.

Document 1: Japanese Patent Application Laid-Open No. 2010-286895
Document 2: Japanese Patent Application Laid-Open No. 2009-244725

However, the conventional display devices have a problem of poor operability. For example, in a case where a user A makes settings concerning print on an operation panel of a multi-functional peripheral, a submenu screen (pop-up screen) for accepting settings concerning print is displayed in a pop-up fashion on a screen displayed before then. When a user B different from the user A wishes to perform operation on the operation panel, for example, the following problem occurs.

Assume that the user A intends to make settings of print color, and the user B wants to select a document file for print. In general, the basic screen of the operation panel of a multi-functional peripheral presents keys including "color setting" and "paper setting" keys according to purposes. The user A presses the key "color setting" from among those keys. Upon accepting the press of the key, the operation panel displays a pop-up screen for "color setting" including "full-color," "two-color," or "black" setting keys on the basic screen. The user A makes color setting as desired by pressing the key of the item that the user A wants to set, for example, the "black" key" on this pop-up screen. After completion of the color setting, the pop-up screen is closed. When the operation panel displays the pop-up screen for "color setting" as described above, the multi-functional peripheral gives operation authority over the pop-up screen only to the user A who makes the pop-up screen display. Therefore, the user B who does not have operation authority over the pop-up screen cannot operate the operation panel (that is, select a document file) until the pop-up screen is closed, and cannot execute the job until the operation by the user A is finished. The user B cannot help but stop the job halfway every time the user A displays a pop-up screen.

The similar problem as described above arises with Document 2. For example, when the user A changes the display screen of the print order apparatus from a screen displaying thumbnail images to a screen for print settings, the operation authority over the print setting screen is only given to the user A who makes the change to the screen for print settings, and another user B cannot resume the job until the display screen of the print order apparatus returns to the initial screen displaying thumbnail images. In these circumstances, in order to allow the user B to resume the job quickly, Document 2 proposes that print order information or information of shot images that have been input by the user B should be transferred to another neighboring print order apparatus. However, with this method, the user B still cannot resume the job if no print order apparatus exists nearby or if a neighboring print order apparatus is used by another user. In particular in a case where the display device is an operation panel of a multi-functional peripheral, a plurality of multi-functional peripherals are rarely arranged adjacent to each other in the same office.

SUMMARY OF THE INVENTION

An object of the present invention is to provide a display device with improved operability.

According to an aspect of the present invention, a display device with a touch panel for displaying a variety of information includes a screen display unit for displaying a plurality of screens overlapping one another on the touch panel, an operation accepting unit for accepting operation on any one of the plurality of screens displayed on the screen display unit, an identification unit for identifying a user who performs the operation accepted by the operation accepting unit, and a screen specifying unit. If the user identified by the identification unit does not have operation authority over a first screen on a highest-level of the plurality of screens, the screen specifying unit does not specify the first screen as a screen serving as a target of the operation accepted by the operation accepting unit but specifies a second screen on a highest level of screens over which the user identified by the identification unit has operation authority, among the plurality of screens, as a screen serving as a target of the operation accepted by the operation accepting unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram schematically showing display screen information stored by an HDD 10.

FIG. 8 is a diagram schematically showing display screen information stored by HDD 10 in a case where a pop-up screen 202 is newly displayed.

FIG. 9 is a diagram schematically showing an operation authority management table stored by HDD 10.

FIG. 10 is a diagram schematically showing the operation authority management table stored by HDD 10 in the case where pop-up screen 202 is newly displayed.

DESCRIPTION OF THE PREFERRED EMBODIMENTS

Embodiments of the present invention will be described below with reference to the drawings.

In the present embodiment, a display device is an MFP (Multi-Functional Peripheral) by way of example. An MFP forms an image by electrophotographic or electrostatic recording technique and has scanner, facsimile, copier and printer functions, a data communication function, and a server function. The display device may be an image forming apparatus other than an MFP, for example, a facsimile machine, a copier such as a PPC (Plain Paper Copier), or a printer such as a laser printer. The display device may be a portable communication terminal as long as it includes a touch panel for displaying a variety of information.

[Overview of Body Area Network Function]

First, an overview of body area network function of an MFP will be described.

Figure 1:
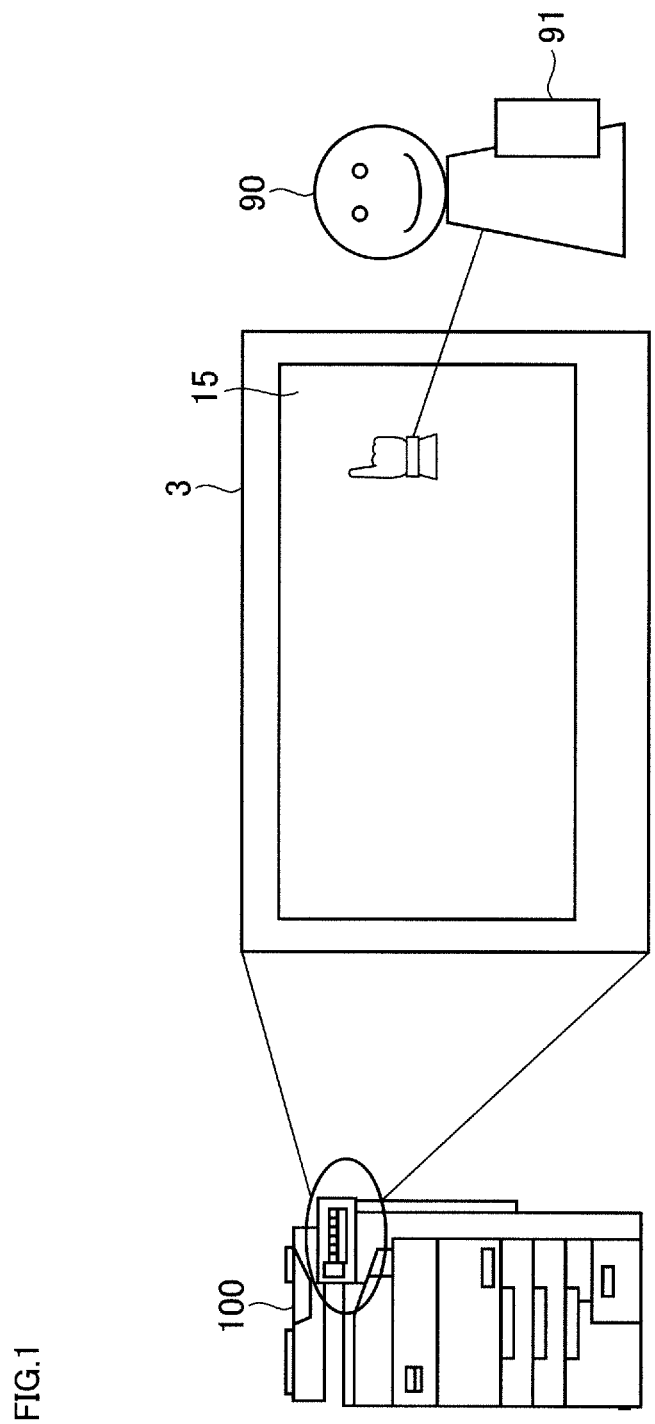
FIG. 1 is a diagram illustrating body area network function of an MFP 100 in an embodiment of the present invention.

Referring to FIG. 1, an MFP 100 has an operation panel 3. Operation panel 3 includes a touch panel 15 for displaying a variety of information. A user 90 can operate MFP 100 by performing touch operation on a screen displayed on touch panel 15.

Operation panel 3 has a body area network function. When user 90 wearing a body area network device 91 performs touch operation on touch panel 15, communication is performed between MFP 100 and body area network device 91 through the human body of user 90. Data exchanged over this body area network is mainly user authentication information (identification information). Every time user 90 touches touch panel 15, the user authentication information is transmitted from body area network device 91 to MFP 100. When accepting touch operation on a key or the like displayed on the screen from a user, MFP 100 specifies the user who performs the touch operation based on the received user authentication information and performs an authentication process for the user who performs the touch operation.

[Configuration of MFP]

A configuration of MFP 100 will now be described.

Figure 2:
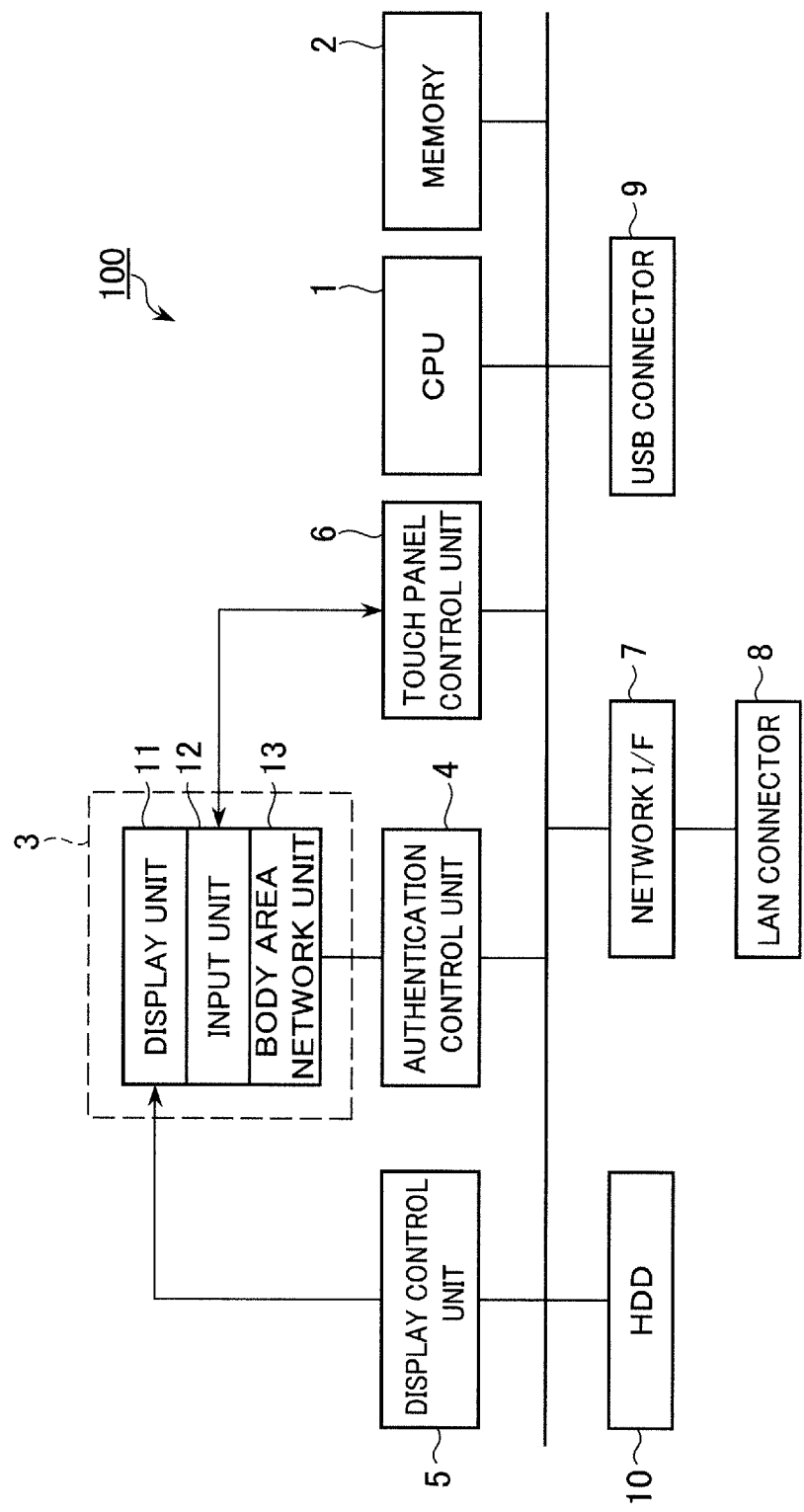
FIG. 2 is a block diagram showing a configuration of MFP 100.

FIG. 2 is a block diagram showing a configuration of MFP 100.

Referring to FIG. 2, MFP 100 includes a CPU 1, a memory 2, an operation panel 3, an authentication control unit 4, a display control unit 5, a touch panel control unit 6, a network I/F 7, a LAN connector 8, a USB connector 9, and an HDD (Hard Disk Drive) 10. Memory 2, operation panel 3, authentication control unit 4, display control unit 5, touch panel control unit 6, network I/F 7, LAN connector 8, USB connector 9, and HDD 10 are each connected to CPU 1 through a bus.

CPU 1 centrally controls MFP 100 for a variety of jobs including a scan job, a copy job, a mail transmission job, and a print job. CPU 1 executes a control program stored in memory 2. CPU 1 reads data from memory 2 and writes data into memory 2 by performing prescribed processing.

Memory 2 includes a RAM (Random Access Memory) and a ROM (Read Only Memory). The RAM is a main memory of CPU 1. The RAM is used to temporarily store image data or data necessary for CPU 1 to execute a control program. The ROM stores a variety of programs for performing operation of MFP 100 and a variety of fixed data. A VRAM (Video RAM) area for touch panel display is reserved in memory 2.

Operation panel 3 includes a display unit 11 for displaying information, an input unit 12 for accepting touch operation, and a body area network unit 13 for communicating with the body area network device when the user touches MFP 100. Body area network unit 13 acquires user authentication information from the body area network device via body area network and transmits the acquired user authentication information to authentication control unit 4.

Authentication control unit 4 identifies (specifies) the user who operates touch panel 15, based on the user authentication information received by the body area network unit 13, and performs an authentication process for the user who operates touch panel 15. When touch panel 15 is operated, authentication control unit 4 performs authentication on an object touched by the user. For example, in a case where a key is arranged at a position touched by the user, authentication is performed on the key, and a process executed by pressing the key is executed as a process of the user who presses the key. In a case where a pop-up screen such as a submenu is newly displayed on touch panel 15 as a result of accepting the press of the key, authentication control unit 4 gives operation authority over the pop-up screen to the user who presses the key. The operation authority is effective until the pop-up screen is closed.

The display control unit 5 acquires screen information from the VRAM area of memory 2 and instructs display unit 11 to form an image. Accordingly, a screen is displayed on touch panel 15. Display control unit 5 also manages display screen information (FIG. 7) and an operation authority management table (FIG. 9) described later.

When touch operation is accepted by input unit 12, touch panel control unit 6 specifies a coordinate position touched by the user on touch panel 15 and transmits information of the specified coordinate position to CPU 1.

Network I/F 7 communicates with an external device via a network with a communication protocol such as TCP/IP in accordance with an instruction from CPU 1.

LAN connector 8 is a terminal for connecting a LAN cable to MFP 100.

USB connector 9 is a terminal for connecting an external device such as a USB memory.

HDD 10 is a storage device to store installation information of MFP 100, screen data for display on touch panel 15, the display screen information, the operation authority management table, or a variety of data concerning operation of MFP 100. HDD 10 includes a box region for storing data such as print data sent from an external device through network I/F 7.

[Configuration of Screens of Touch Panel]

A configuration of screens displayed by touch panel 15 will now be described.

Figure 3:
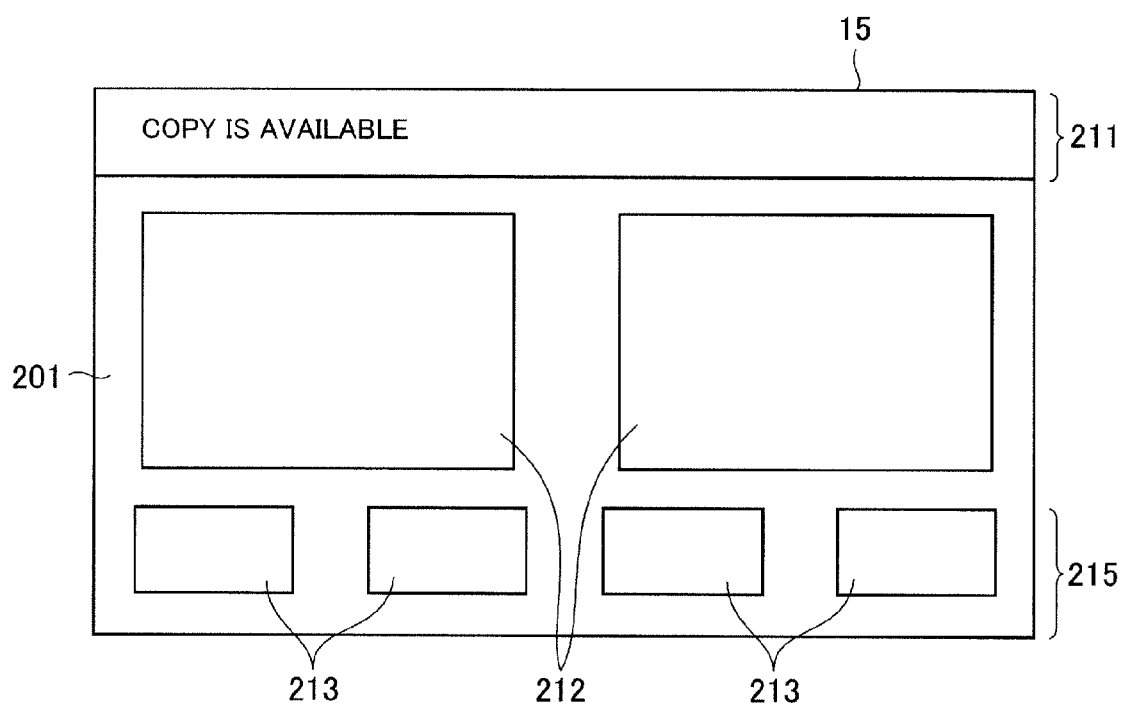
FIG. 3 is a diagram schematically showing a base screen (operation screen) displayed on a touch panel 15.
Figure 4:
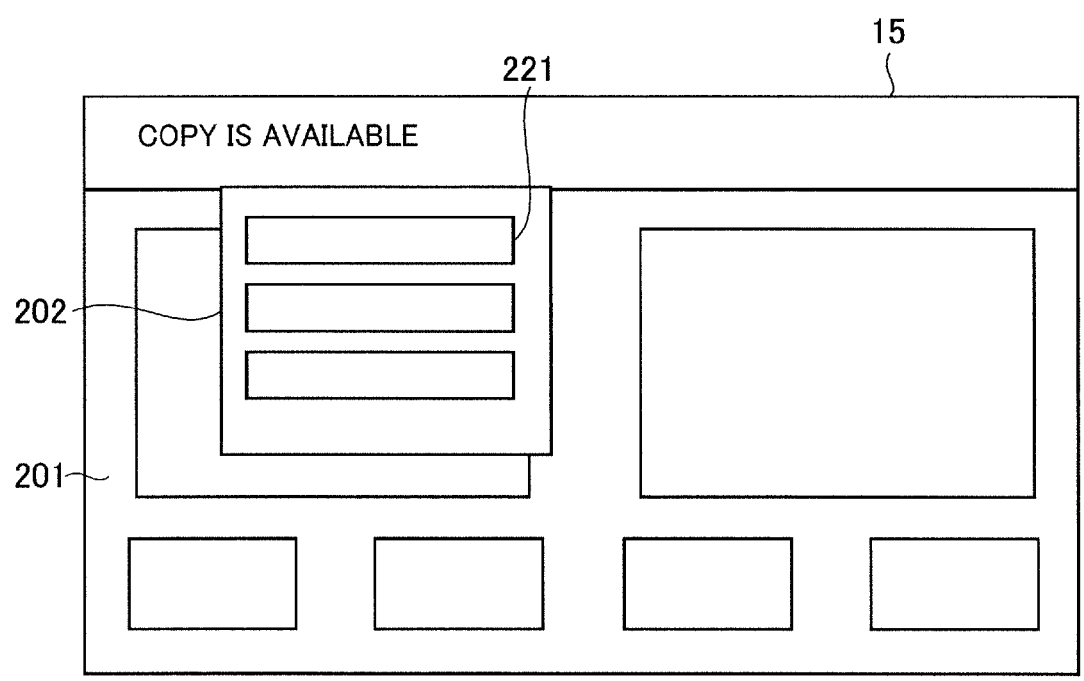
FIG. 4 is a diagram schematically showing a base screen and a pop-up screen displayed on touch panel 15.

FIG. 3 is a diagram schematically showing a base screen (operation screen) displayed on touch panel 15. FIG. 4 is a diagram schematically showing a base screen and a pop-up screen displayed on touch panel 15.

Referring to FIG. 3, a base screen 201 of touch panel 15 mainly includes a message area 211 for displaying a variety of messages to users, a preview area 212 for previewing a scanned image or an image to be printed, and a key arrangement area 215 for displaying a plurality of setting keys 213 for changing a variety of settings of MFP 100. When any one of setting keys 213 is pressed, a pop-up screen 202 is displayed in front of base screen 201 as shown in FIG. 4. Display control unit 5 displays a plurality of screens overlapping one another (hierarchically) on touch panel 15 in this manner. An object 221 related to the pressed setting key 213 appears as a submenu in pop-up screen 202. Pop-up screen 202 may be displayed translucently.

Figure 5:
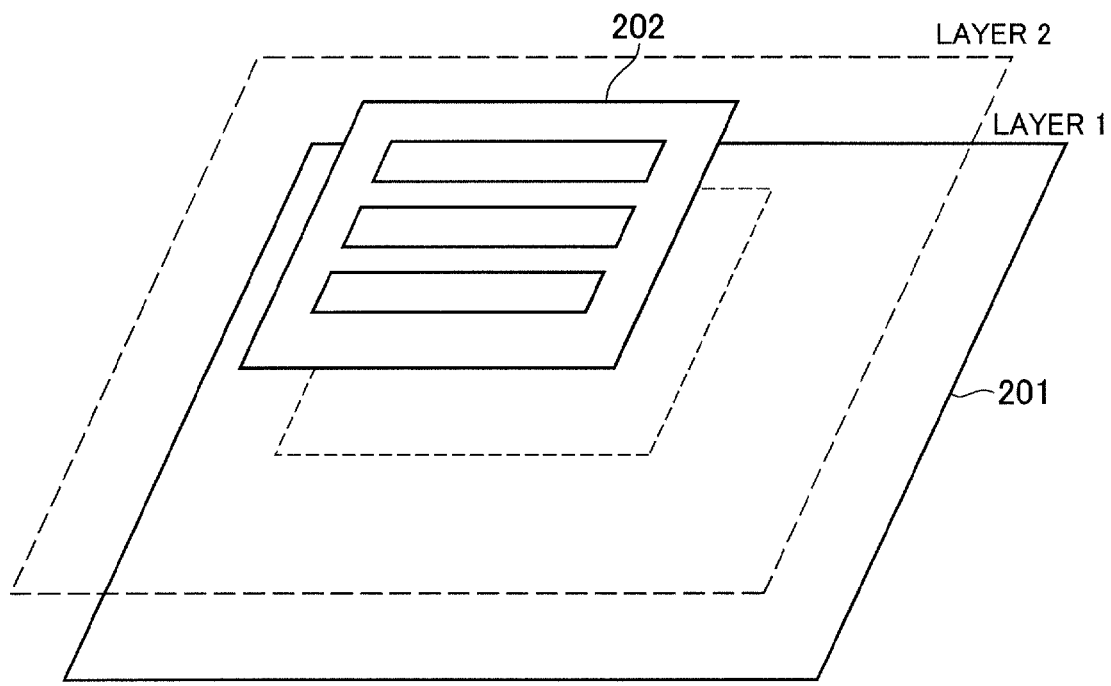
FIG. 5 is a diagram showing the base screen and the pop-up screen shown in FIG. 4 layer by layer.

FIG. 5 is a diagram showing the base screen and the pop-up screen shown in FIG. 4 layer by layer.

Referring to FIG. 5, base screen 201 is displayed on a lowest-level layer 1, and pop-up screen 202 is displayed on a layer 2 immediately above layer 1. Although that portion of base screen 201 which underlies pop-up screen 202 is hidden under pop-up screen 202 and actually does not appear, base screen 201 and pop-up screen 202 are displayed simultaneously in terms of the structure of screens of touch panel 15. Although FIG. 5 shows only two layers, touch panel 15 may have three or more layers.

Figure 6:
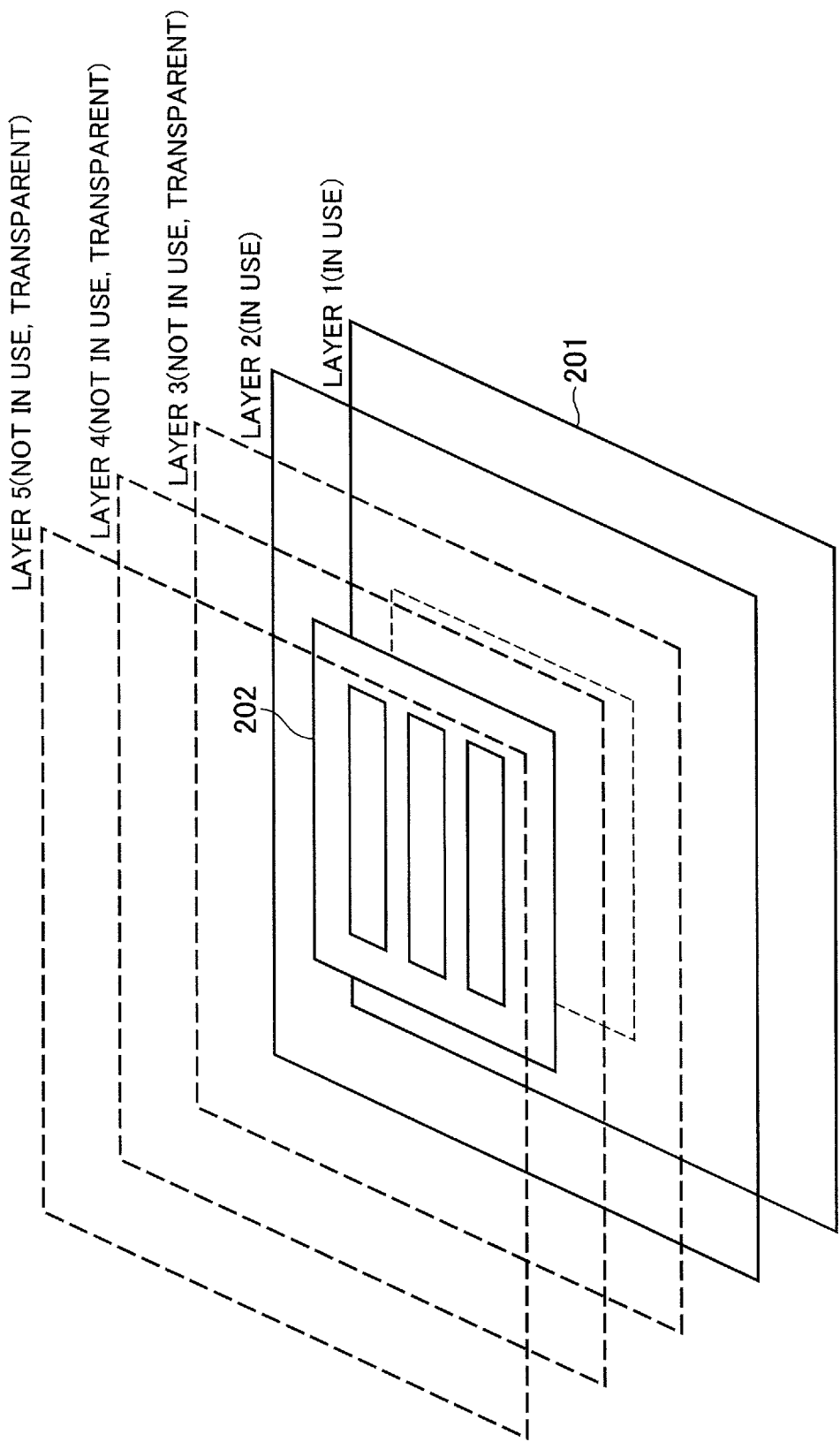
FIG. 6 is a diagram schematically showing all layers of touch panel 15.

FIG. 6 is a diagram schematically showing all layers of touch panel 15.

Referring to FIG. 6, touch panel 15 has, for example, five layers, namely, layer 1 to layer 5. When base screen 201 and pop-up screen 202 are displayed on touch panel 15, layer 3 to layer 5 not being used are transparent. Therefore, the user who views the display screen of touch panel 15 is not aware of the existence of layer 3 to layer 5.

In the case where base screen 201 and pop-up screen 202 are displayed on touch panel 15, when touch panel 15 accepts operation to display a new pop-up screen, the newly displayed pop-up screen is displayed on layer 3 which is the lowest-level layer of layer 3 to layer 5 not being used. In other words, layer 1 to layer 5 are used in such a manner that the layer on the lowest level is used by priority.

The VRAM area is reserved in memory 2 corresponding to the number of layers of touch panel 15. As shown in FIG. 6, if touch panel 15 has five layers, the VRAM area corresponding to five screens is reserved in memory 2. The number of layers of touch panel 15 may be five or more as long as the VRAM area corresponding to the number of layers is reserved in memory 2.

FIG. 7 and FIG. 8 are diagrams schematically showing the display screen information stored by HDD 10.

Referring to FIG. 7(a), the display screen information is information of each object included in a display screen of touch panel 15. The contents of the display screen information are updated in accordance with a change in display screen of touch panel 15. For example, in a case where only base screen 201 is displayed on touch panel 15 as shown in FIG. 3, only information of each object included in base screen 201 is written in the display screen information. Specifically, in the display screen information, objects named "preview 1" and "preview2" correspond to two objects displayed in preview area 212, an object named "message area" corresponds to an object displayed in message area 211, and objects named "setting key 1," "setting key 2," "setting key 3," and "setting key 4" correspond to a plurality of setting keys 213 displayed in key arrangement area 215.

Information of an object includes an object ID, an object name, an object coordinate position, and whether to present pop-up display when the object is pressed. If each object is rectangular, the object coordinate position is indicated as coordinates (x, y) of each of vertexes A, B, C, and D of the object, for example, as shown in FIG. 7(b).

For example, in the case where pop-up screen 202 is newly displayed on touch panel 15 as a result of accepting the press of setting key 213 as shown in FIG. 4, information of objects included in pop-up screen 202 (layer 2) is added to the display screen information as shown in FIG. 8. When pop-up screen 202 is erased from touch panel 15, the information of objects included in pop-up screen 202 is deleted from the display screen information, so that the display screen information is reset to the contents shown in FIG. 7.

FIG. 9 and FIG. 10 are diagrams schematically showing the operation authority management table stored by HDD 10.

Referring to FIG. 9, the operation authority management table is a table for managing the status of use and the status of given operation authority for each of five layers, namely, layer 1 to layer 5, of touch panel 15. The contents of the operation authority management table are updated in accordance with a change in display screen of touch panel 15.

For example, when layer 1 of touch panel 15 is used by base screen 201 and layer 2 to layer 5 are not used (the case in FIG. 3), the field indicating the status of use of layer 1 is set as being used. In the operation authority field, the names of "user A," "user B" and "user C" who are users having operation authority over the screen displayed on layer 1 are written. The names of all the users that can use MFP 100 are written in the operation authority field because base screen 201 is an initial screen of operation panel 3.

For example, in a case where pop-up screen 202 is newly displayed on touch panel 15 as a result of accepting the press of setting key 213 from user A (the case in FIG. 4), the field indicating the status of use of layer 2 is set as being used as shown in FIG. 10. In the operation authority field, the name of "user A" who is a user having operation authority over the screen displayed on layer 2 is written. The user having operation authority over layer 2 is the user who performs operation to newly display a pop-up screen of layer 2.

Display control unit 5 transmits the display screen information and the status of given operation authority of the designated layer to CPU 1 in response to a request from CPU 1.

[Operation of MFP]

The operation of MFP 100 in the present embodiment will now be described.

In the present embodiment, a plurality of users simultaneously operate operation panel 3 to print document files or image files stored in HDD 10 of MFP 100, by way of example. The document files or the images files may be those stored in HDD 10, or may be those read from an external storage medium such as a USB memory connected to USB connector 9 or read from an in-house shared file server connected to MFP 100 via an intra-company network such as a LAN.

Figure 11:
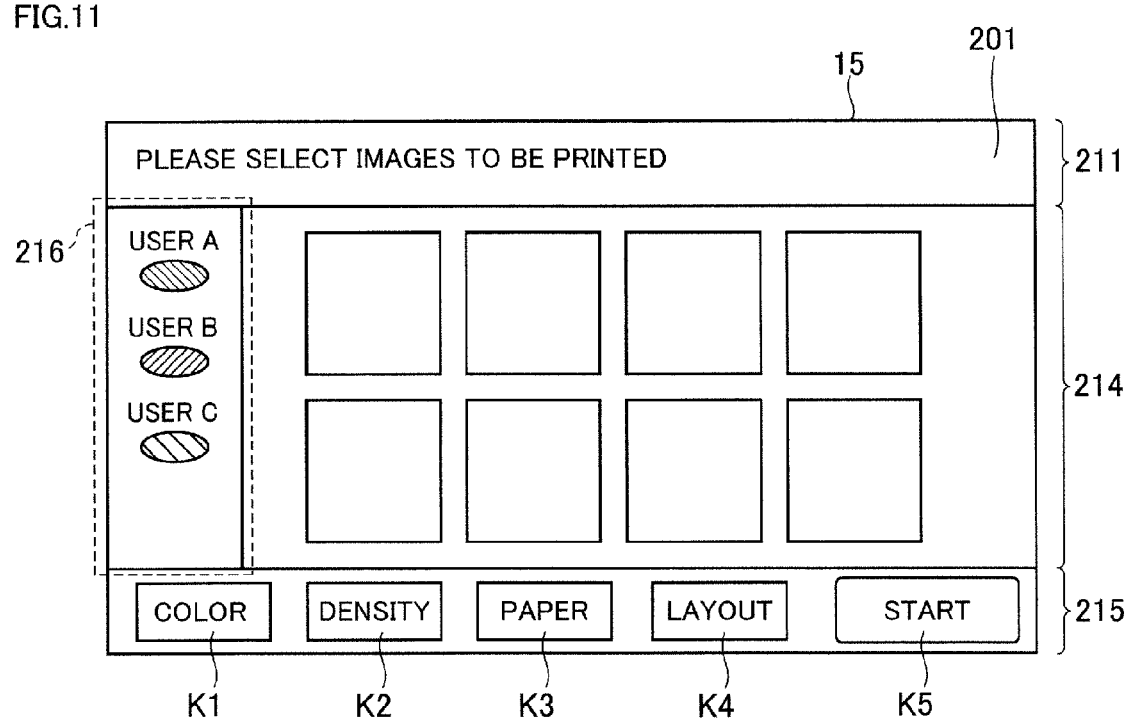
FIG. 11 is a diagram schematically showing a screen in which a list of document files and image files is displayed as thumbnail images.

FIG. 11 is a diagram schematically showing a screen that displays a list of document files and image files as thumbnail images.

Referring to FIG. 11, a screen that displays a list of document files and image files as thumbnail images is displayed as base screen 201 on layer 1 of touch panel 15. In this case, base screen 201 includes a message area 211 for displaying a variety of messages to users, a thumbnail image display area 214 for displaying thumbnail images, a key arrangement area 215 for displaying keys K1 to K4 as setting keys for changing various settings concerning print and a key K5 as a start key for executing print, and a user display area 216 for displaying a list of users who can operate MFP 100.

User display area 216 displays the names of "user A," "user B," and "user C." A color for distinguishing between users is allocated to each user. Each user can select a file to be printed by touching a thumbnail image. Here, each user can perform a process of selecting a file that the user wants to print, without waiting until any other user finishes selecting a file (concurrently (simultaneously) with a file selecting operation by any other user).

Figure 12:
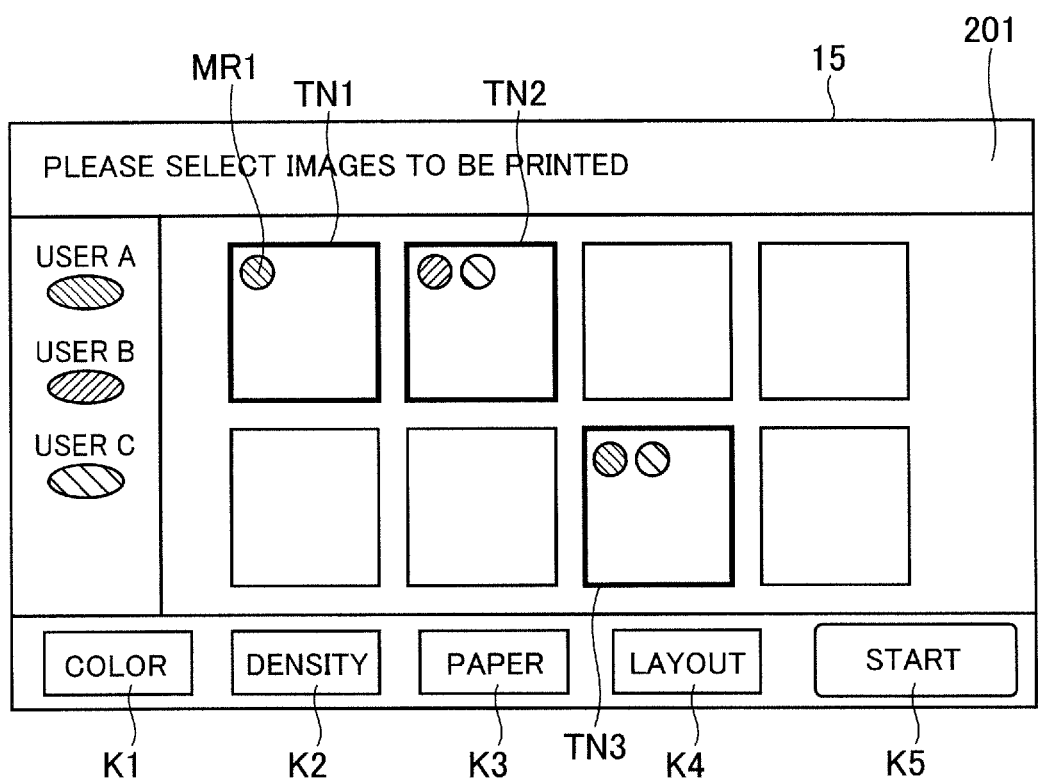
FIG. 12 is a diagram schematically showing a screen in a case where each user is selecting a file to print.

FIG. 12 is a diagram schematically showing a screen in a case where each user selects a file that the user wants to print.

Referring to FIG. 12, MFP 100 has a panel control function in accordance with operation authority. When selection of a thumbnail image is accepted from a user, MFP 100 authenticates the user who selects the thumbnail image. This authentication is performed based on user authentication information received from the user's body area network device when the user touches touch panel 15.

If it is verified that the user who selects the thumbnail image has operation authority over base screen 201, MFP 100 highlights the selected thumbnail image with a thick line or a color and also displays information on the thumbnail image for distinguishing the user who selected the thumbnail image. The information for distinguishing the user is displayed, for example, at the upper left corner of the thumbnail image with a marking MR1 (circle) having the color allocated to the user. In FIG. 12, a thumbnail image TN1 is selected by user A, a thumbnail image TN2 is selected by user B and user C, and a thumbnail image TN3 is selected by user A and user C.

When accepting the press of key K5 as a start key, MFP 100 prints the file corresponding to the thumbnail image selected by the user who presses key K5. The user who presses key K5 is identified based on the user authentication information received from the user's body area network device when the user touches touch panel 15. As a result, only the file corresponding to the thumbnail image selected by the user who presses key K5 is printed.

When the user wishes to change the print settings from the default state, the user appropriately presses keys K1 to K4 as setting keys before pressing key K5. Key K1 as a color setting key is a key pressed when print color is set. Key K2 as a density setting key is a key pressed when print density is set. Key K3 as a paper setting key is a key pressed when print paper is set. Key K4 as a layout key is a key pressed when print layout is set. When the press of any one of keys K1 to K4 is accepted, MFP 100 displays a pop-up screen of a submenu of the setting corresponding to that key.

Figure 13:
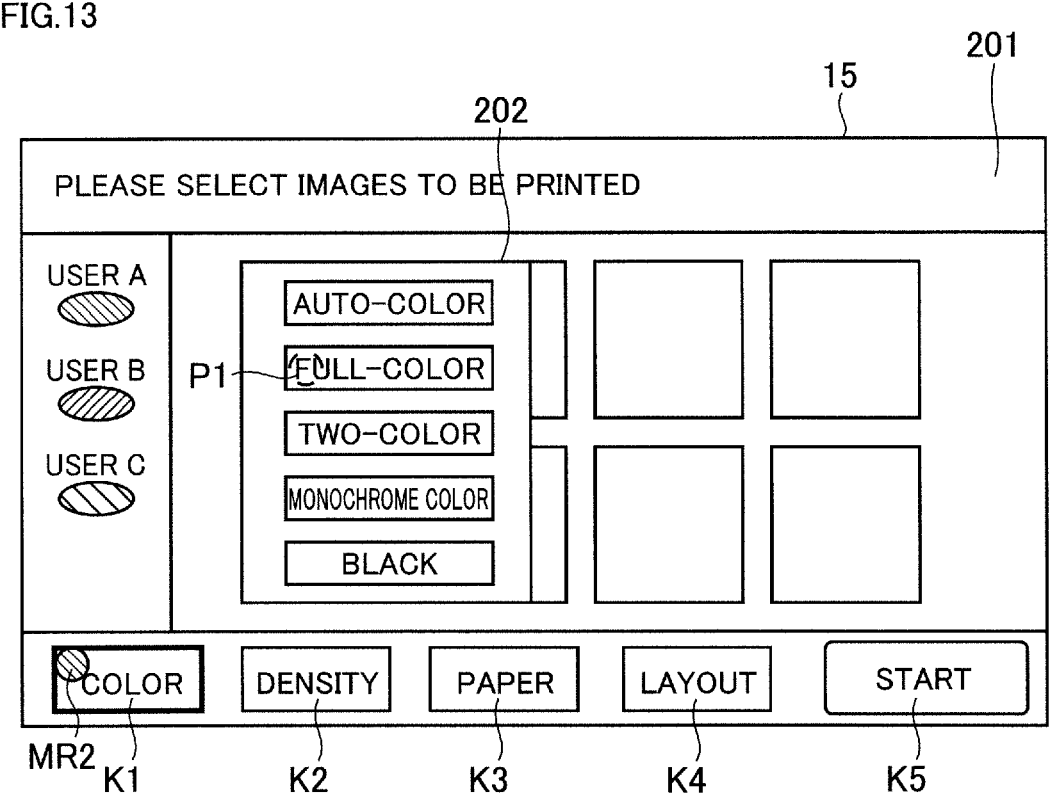
FIG. 13 is a diagram schematically showing a screen in a case where a user A presses a key K1.

FIG. 13 is a diagram schematically showing a screen when user A presses key K1.

Referring to FIG. 13, when the press of key K1 by user A is accepted, MFP 100 identifies that user A presses key K1, based on the user authentication information received from the body area network device of user A. MFP 100 then verifies whether the identified user A is included in the users having operation authority over base screen 201.

If it is verified that the user who presses key K1 has operation authority over base screen 201, MFP 100 displays a new pop-up screen 202 including a submenu for changing color setting on layer 2 of touch panel 15. Pop-up screen 202 is displayed in front of base screen 201. With the display of pop-up screen 202, the display screen information is updated from the contents shown in FIG. 7 to the contents shown in FIG. 8, and the operation authority management table is updated from the contents shown in FIG. 9 to the contents shown in FIG. 10.

The operation authority over pop-up screen 202 is given only to user A who activates pop-up screen 202. In other words, users not having operation authority (users excluding user A) cannot a make setting of the submenu included in pop-up screen 202. If a user not having operation authority performs touch operation on pop-up screen 202, MFP 100 discards the touch operation on pop-up screen 202.

In order to clearly show the user having operation authority over pop-up screen 202, when a setting key is pressed, a marking MR2 having the color allocated to the user who presses the setting key may be displayed, for example, at the upper left corner of the pressed key K1.

If user A performs touch operation on a position P1, MFP 100 changes the print color setting of user A to full color because the position P1 is included in the setting key "full color" of pop-up screen 202. The color setting made by user A on pop-up screen 202 is reflected only in the print done by user A and is not reflected in the print done by user B or user C. Therefore, if user B or user C executes printing by pressing key K5 after user A makes a color setting, the print is done with default settings.

The users not having operation authority over pop-up screen 202 can operate the screens displayed on the lower-level layers than pop-up screen 202 even when pop-up screen 202 is being displayed.

Figure 14:
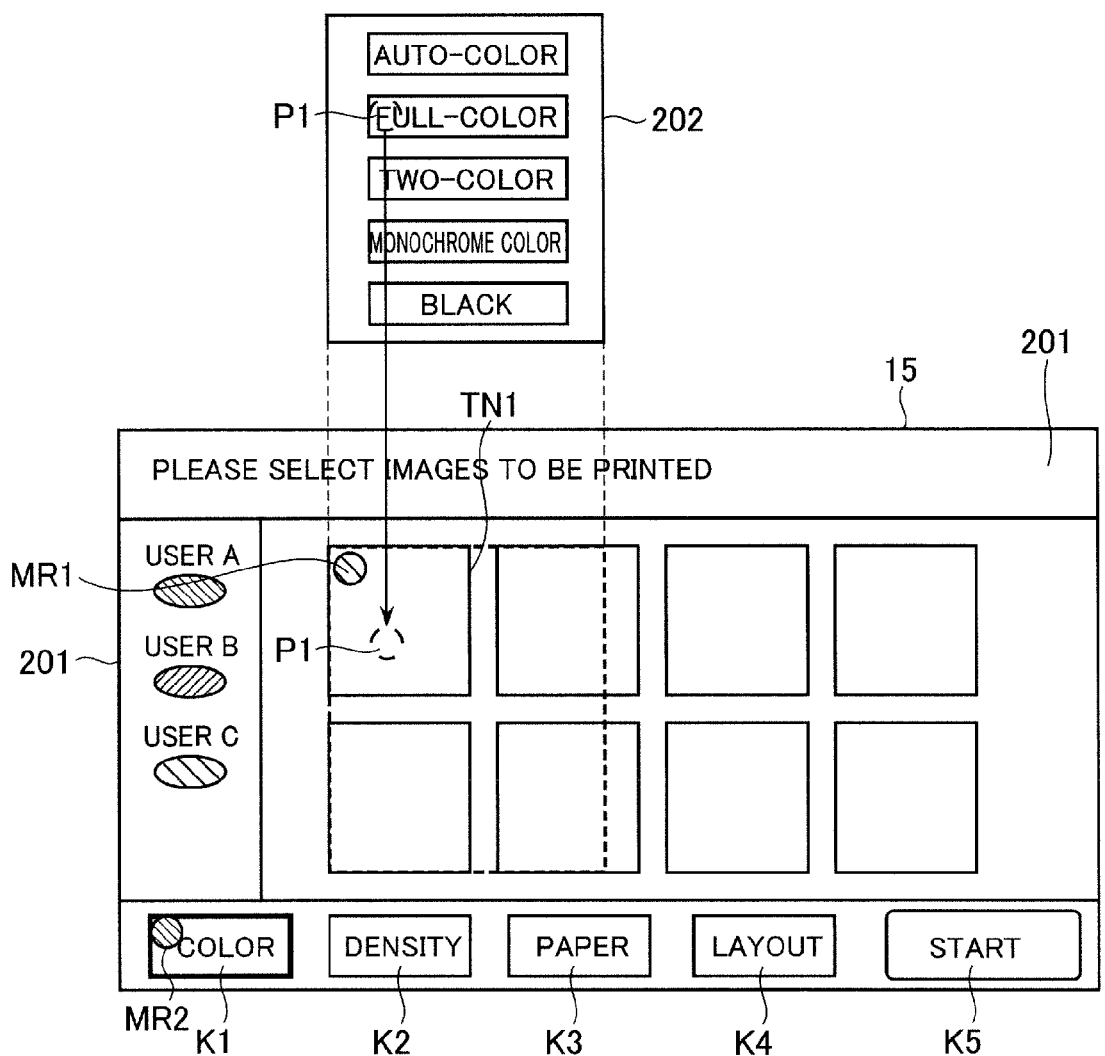
FIG. 14 is a diagram for explaining operation accepted by MFP 100 in a case where a user C not having operation authority over pop-up screen 202 makes touch operation on pop-up screen 202.

FIG. 14 is a diagram for explaining operation accepted by MFP 100 when user C not having operation authority over pop-up screen 202 performs touch operation on pop-up screen 202.

Referring to FIG. 14, it is assumed that user C presses a position (coordinate position) P1. In this case, MFP 100 does not accept a change of color setting by user C, but specifies base screen 201, which is a screen on the lowest-level layer of the screens over which the user C has operation authority, as a screen to be operated, and applies the press at position P1 to base screen 201. Since thumbnail image TN1 is present at position P1 on base screen 201, MFP 100 determines that user C selects thumbnail image TN1 and performs a process of selecting the thumbnail image. As a result, a marking MR3 having the color allocated user C is displayed at the upper left corner of thumbnail image TN1.

In a case where a user who performs touch operation still does not have operation authority over the layer immediately below, MFP 100 confirms whether the user has authority to operate the layer next below. MFP 100 repeatedly confirms whether the user has operation authority over a screen, successively layer by layer, up to the screen on the lowest-level layer.

Figure 15:
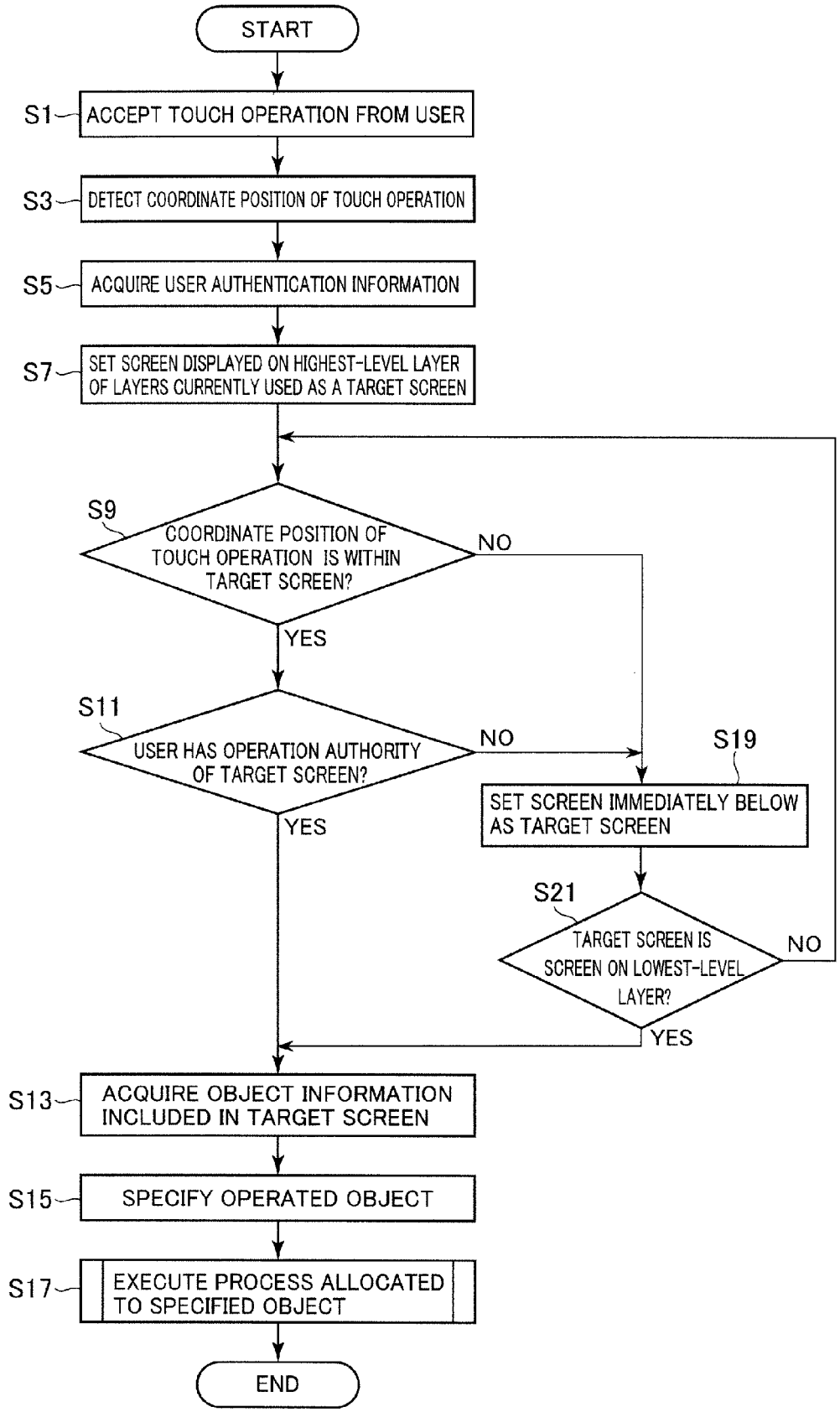
FIG. 15 is a flowchart showing an operation of MFP 100 in an embodiment of the present invention.

FIG. 15 is a flowchart showing an operation of MFP 100 in an embodiment of the present invention.

Referring to FIG. 15, in this flowchart, when the user's touch operation is detected, MFP 100 successively confirms whether the user who performs touch operation has operation authority over the screens, starting from the screen displayed on the highest-level layer among the screens on the layers currently used. As a result, MFP 100 applies the coordinate position of the detected touch operation to the screen displayed on the highest-level layer among the screens over which the user has operation authority, and executes a process allocated to an object present at the coordinate position.

Specifically, when a user performs touch operation on touch panel 15 (touch operation input), CPU 1 of MFP 100 accepts the touch operation (S1) and allows touch panel control unit 6 to detect the coordinate position of the touch operation on touch panel 15 (S3). Then, CPU 1 allows authentication control unit 4 to acquire user authentication information from the user's body area network device, and specifies the user who performs the touch operation (S5). CPU 1 then sets the screen displayed on the highest-level layer of the layers currently used, as a target screen, by referring to the operation authority management table (S7). CPU 1 then determines whether the coordinate position of the touch operation is within the target screen, by referring to the display screen information (S9).

In step S9, if it is determined that the coordinate position is within the target screen (YES in S9), CPU 1 determines whether the user who performs touch operation has operation authority over the target screen, by referring to the operation authority management table (S11).

In step S11, if it is determined that the user has operation authority (YES in S11), CPU 1 applies the detected coordinate position of the touch operation to the target screen and executes a process allocated to an object present at the coordinate position. Specifically, CPU 1 acquires information of an object included in the target screen from the display screen information (S13) and specifies the operated object (S15). CPU 1 then executes a process allocated to the specified object (S17) and terminates the process. The details of the process in step S17 will be described later.

If it is determined that the coordinate position is not within the target screen in step S9 (NO in S9), or if it is determined that the user does not have operation authority in step S11 (NO in S11), CPU 1 newly sets the screen displayed immediately below the current target screen as a target screen (S19) and determines whether the newly set target screen is the screen on the lowest-level layer (layer 1) (S21).

In step S21, if it is determined that the newly set target screen is the screen on the lowest-level layer (YES in S21), CPU 1 proceeds to the process in step S13. On the other hand, in step S21, if it is determined that the newly set target screen is not the screen on the lowest-level layer (NO in S21), CPU 1 proceeds to the process in step S9.

Figure 16:
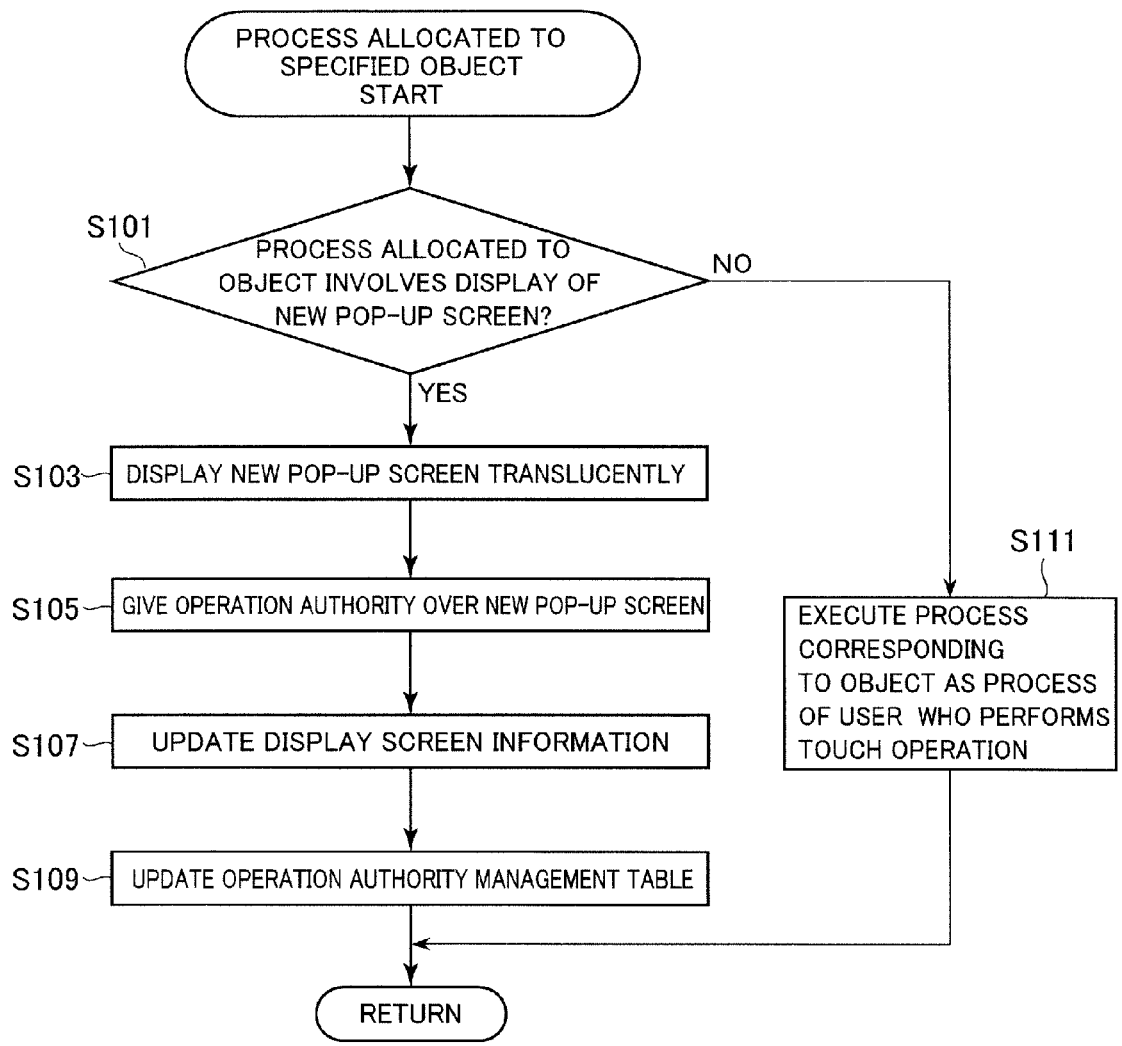
FIG. 16 shows a subroutine of step S17 in FIG. 15.

FIG. 16 is a subroutine of step S17 in FIG. 15.

Referring to FIG. 16, in the process allocated to the object in step S17, CPU 1 determines whether the process allocated to the object involves display of a new pop-up screen, by referring to the display screen information (S101).

In step S101, if it is determined that display of a new pop-up screen is involved (YES in S101), CPU 1 displays a new pop-up screen, for example, translucently (S103) and gives operation authority over the new pop-up screen to the user who performs operation (S105). CPU 101 then allows display control unit 5 to update the display screen information so that information of each object included in the new pop-up screen is added (S107), and allows display control unit 5 to update the operation authority management table so that operation authority over the new pop-up screen is added (S109). The process then returns.

In step S101, if it is determined that display of a new pop-up screen is not involved (NO in S101), CPU 1 executes a process corresponding to the object as the process of the user who performs touch operation (S111). The process then returns.

In the flowchart in FIG. 16, in step S103, the new pop-up screen may be displayed in a normal state (non-translucent state). If touch operation is accepted from a user not having authority over any of the layers among the screens of layers currently used, MFP 100 may discard the touch operation by the user and information of the coordinate position of the touch operation as will be described with reference to the flowchart in FIG. 17 below.

Figure 17:
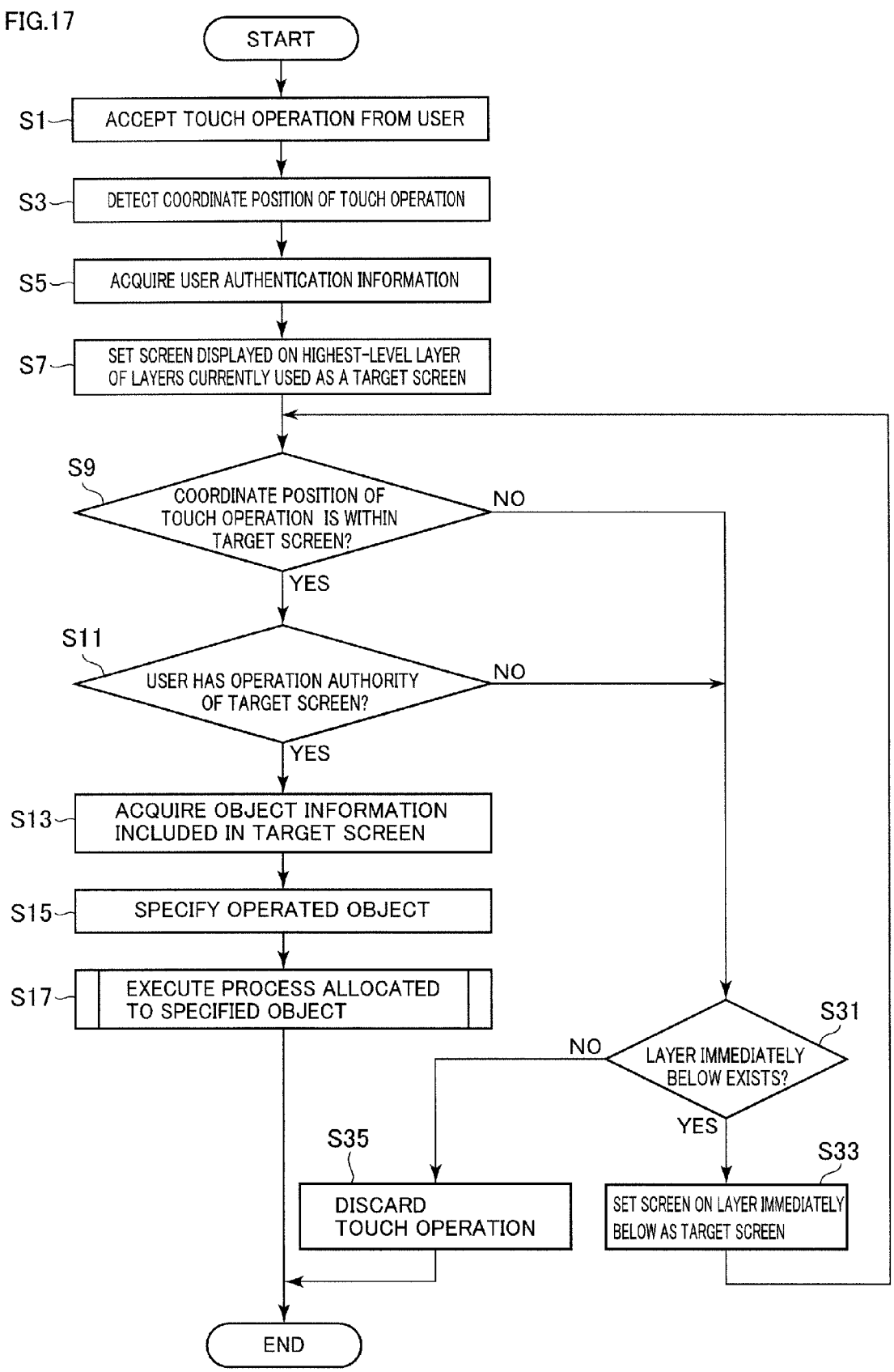
FIG. 17 is a flowchart showing a first modification of the operation of MFP 100 in an embodiment of the present invention.

FIG. 17 is a flowchart showing a first modification of the operation of MFP 100 in an embodiment of the present invention.

Referring to FIG. 17, this flowchart differs from the flowchart shown in FIG. 15 in that the process in step S31 is performed when it is determined that the coordinate position of the touch operation is not within the target screen in step S9 (NO in S9) or when it is determined that the user does not have operation authority in step S11 (NO in S11). The other process in this modification is the same as the process in the flowchart shown in FIG. 15, and a description thereof is thus not repeated.

In step S31, CPU 1 determines whether a layer immediately below exists (S31). In step S31, if it is determined that a layer immediately below exists (YES in S31), CPU 1 sets the screen on the layer immediately below as a target screen (S33) and proceeds the process in step S9. On the other hand, in step S31, if it is determined that a layer immediately below does not exist (NO in S31), the user whose operation is accepted does not have authority over any one of the layers currently used. In this case, CPU 1 discards the touch operation by the user and the information of the coordinate position of the touch operation (S35), and terminates the process.

[Change in Display State of Pop-Up Screen]

The description below gives a case where a display state of a pop-up screen over which the user whose touch operation is accepted does not have operation authority is changed.

For example, it is assumed that touch operation is accepted from a user not having operation authority over a pop-up screen on the highest level in a state in which a plurality of screens are being displayed on touch panel 15. In this case, MFP 100 accepts the touch operation as touch operation on the screen on the highest-level layer of the screens over which the user has operation authority, among other screens below the pop-up screen. In this case, it is preferable to change the display state of the pop-up screen so that the user can easily view the screen on which touch operation is accepted. An example of a manner of changing the display state of the pop-up screen will be described below.

Figure 18:
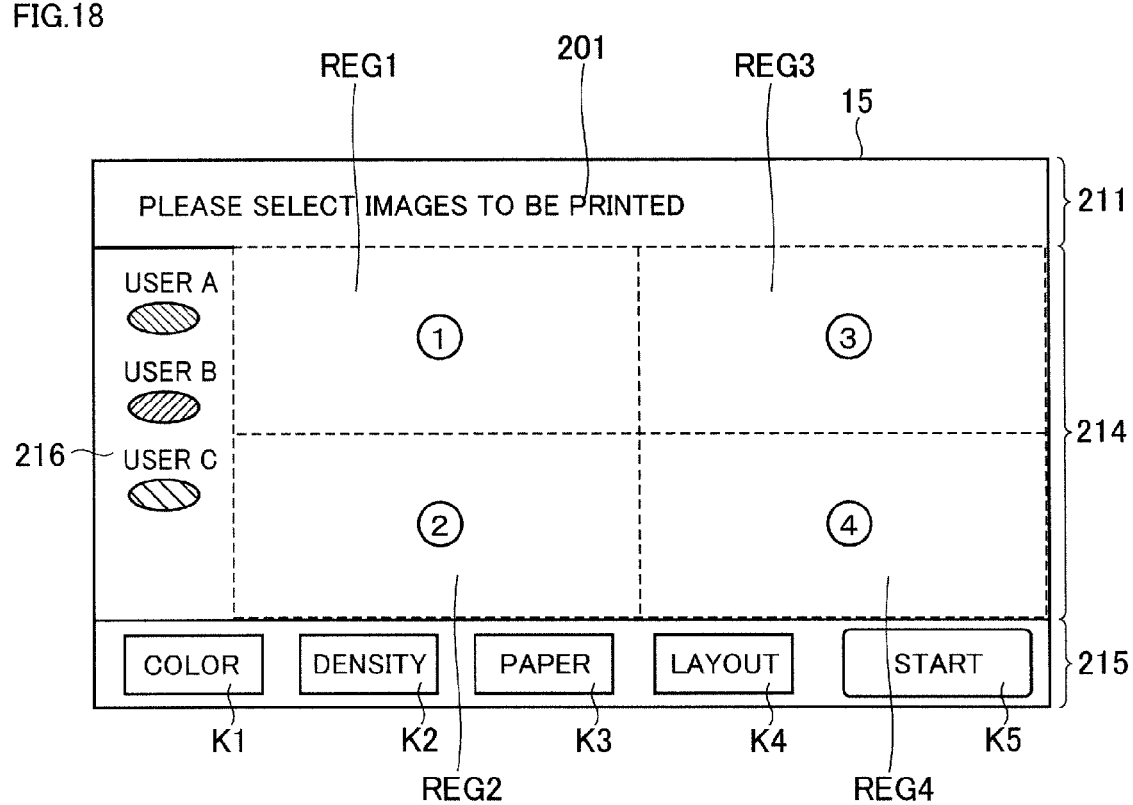
FIG. 18 is a diagram showing that a thumbnail image display area 214 on the screen in FIG. 11 is virtually divided into equal four regions.

FIG. 18 is a diagram showing that thumbnail display area 214 on the screen in FIG. 11 is virtually divided into four equal regions.

Referring to FIG. 18, when thumbnail image display area 214 is divided into four equal regions, an upper left region REG1, a lower left region REG2, an upper right region REG3, and a lower right region REG4 are created. Keys K1 to K4 that are setting keys for changing various settings concerning print are displayed in the lower part in FIG. 18. When any one of keys K1 to K4 is pressed, the pop-up screen corresponding to the key is displayed in front of the base screen (on the higher-level layer than the layer of the base screen 201). The size of the pop-up screen displayed varies with the number or kind of submenu items included in that pop-up screen.

Figure 19:
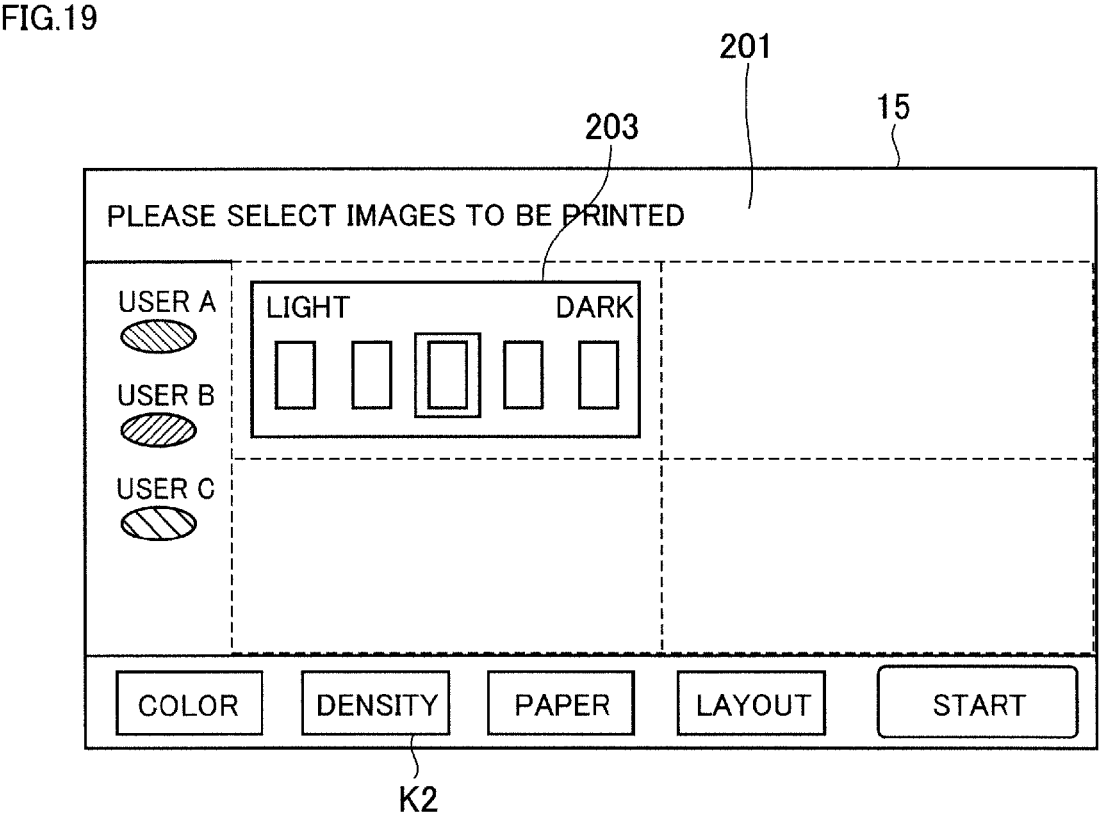
FIG. 19 is a diagram schematically showing a pop-up screen 203 for density setting displayed on touch panel 15.

FIG. 19 is a diagram schematically showing a pop-up screen 203 for density setting that is displayed on touch panel 15.

Referring to FIG. 19, when the press of key K2 as a density setting key is accepted, MFP 100 displays pop-up screen 203 including the submenu of density setting on touch panel 15. Pop-up screen 203 for density setting fits in one of the four regions. Pop-up screen 203 is displayed, for example, in the upper left region.

Figure 20:
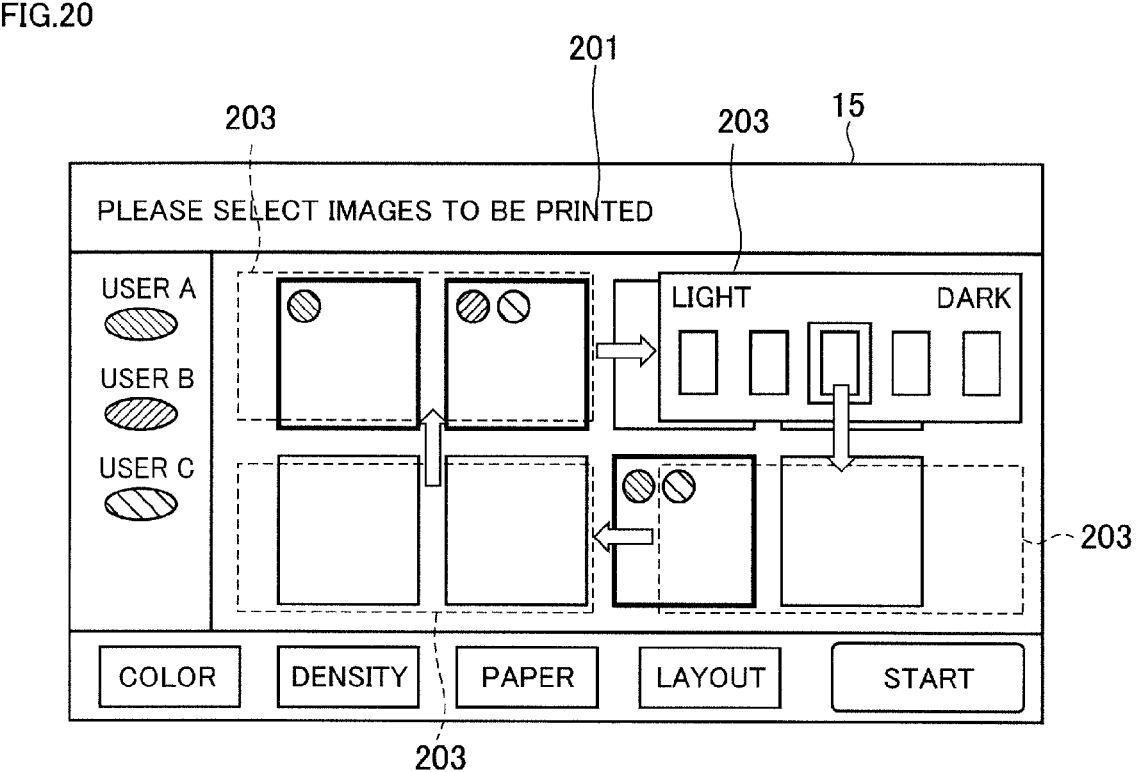
FIG. 20 is a diagram schematically showing pop-up screen 203 with the display state changed.

FIG. 20 is a diagram schematically showing pop-up screen 203 with the display state changed.

Referring to FIG. 20, when touch operation on pop-up screen 203 is accepted from a user not having operation authority over pop-up screen 203 in the state in which pop-up screen 203 is displayed in the upper left region of touch panel 15, MFP 100 accepts the touch operation as touch operation on base screen 201. In this case, MFP 100 shifts pop-up screen 203 to the upper right region of touch panel 15 so that the user can easily view the touch position on base screen 201. Thereafter, when touch operation on pop-up screen 203 is accepted from a user not having operation authority over pop-up screen 203 in the state in which pop-up screen 203 is present in the upper right region of touch panel 15, MFP 100 shifts pop-up screen 203 to the lower right region of touch panel 15. When touch operation on pop-up screen 203 is accepted from a user not having operation authority over pop-up screen 203 in the state in which pop-up screen 203 is present in the lower right region of touch panel 15, MFP 100 shifts pop-up screen 203 to the lower left region of touch panel 15. When touch operation on pop-up screen 203 is accepted from a user not having operation authority over pop-up screen 203 in the state in which pop-up screen 203 is present in the lower left region of touch panel 15, MFP 100 shifts pop-up screen 203 to the upper left region of touch panel 15.

When pop-up screen 203 is shifted, pop-up screen 203 may be shifted clockwise as described above or may be shifted counterclockwise.

When touch operation on pop-up screen 203 is accepted from a user not having operation authority over pop-up screen 203, MFP 100 may make pop-up screen 203 translucent or may hide pop-up screen 203 (make it transparent), rather than shifting pop-up screen 203 as described above. It is noted that even when pop-up screen 203 is hidden, layer 2 of pop-up screen 203 is being used, and therefore, the status field for layer 2 in the operation authority management table is still set as being used.

Figure 21:
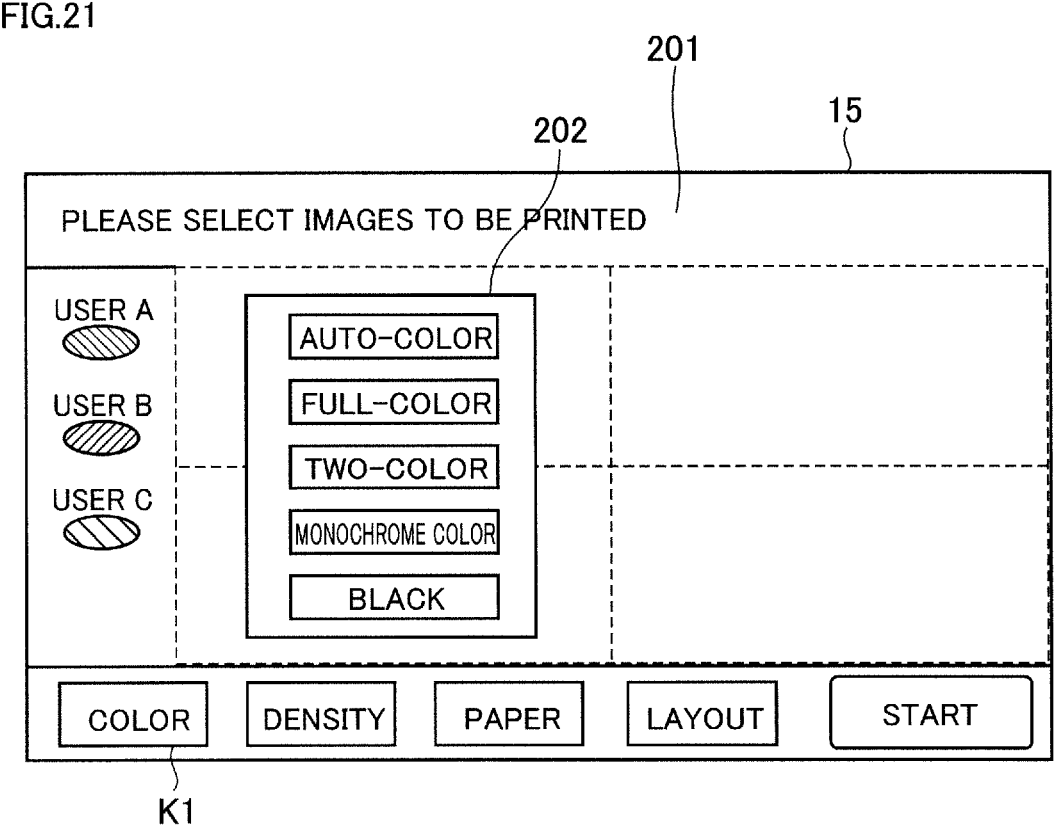
FIG. 21 is a diagram schematically showing pop-up screen 202 for color setting displayed on touch panel 15.

FIG. 21 is a diagram schematically showing pop-up screen 202 for color setting that is displayed on touch panel 15.

Referring to FIG. 21, when the press of key K1 as a color setting key is accepted, MFP 100 displays pop-up screen 202 including a submenu of color setting on touch panel 15. Pop-up screen 202 for color setting takes up two regions of the four regions. Pop-up screen 202 is displayed, for example, in two regions on the left side.

Figure 22:
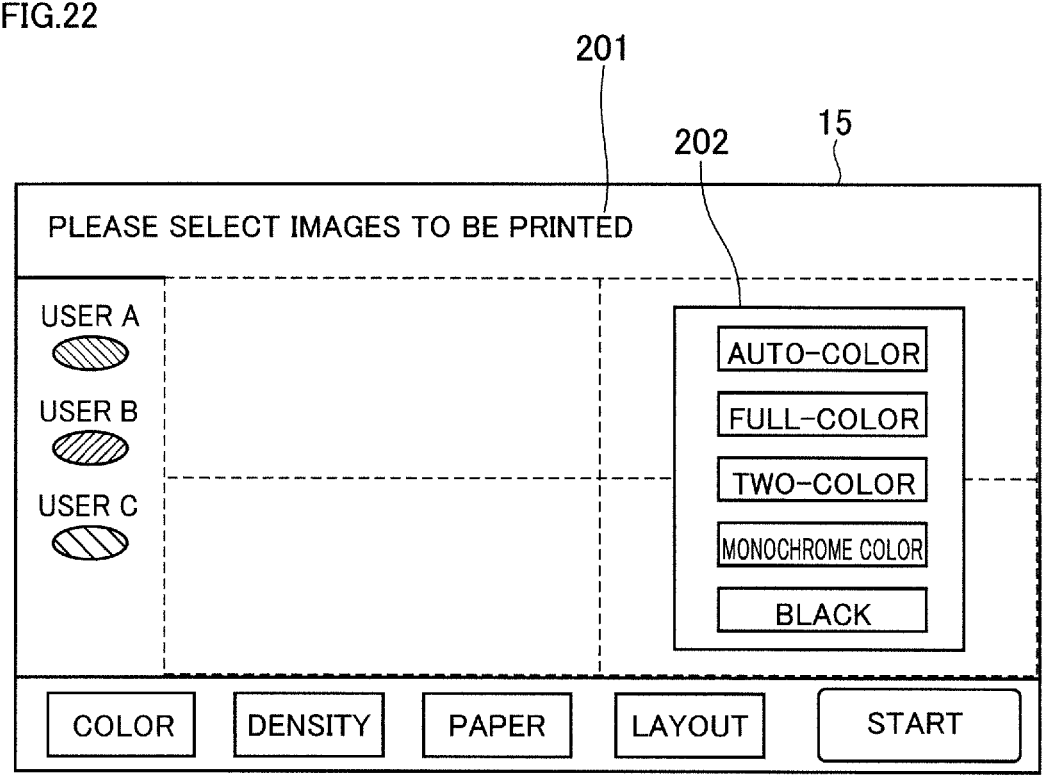
FIG. 22 is a diagram schematically showing an example of pop-up screen 202 with the display state changed.

FIG. 22 is a diagram schematically showing an example of pop-up screen 202 with the display state changed.

Referring to FIG. 22, when touch operation on pop-up screen 202 is accepted from a user not having operation authority over pop-up screen 202 in the state in which pop-up screen 202 is displayed in the two regions on the left side of touch panel 15, MFP 100 accepts the touch operation as touch operation on base screen 201. In this case, MFP 100 shifts pop-up screen 202 to the two regions on the right side of touch panel 15 so that the user can easily view the touch operation on base screen 201. Thereafter, when touch operation on pop-up screen 202 is accepted from a user not having operation authority over pop-up screen 202 in the state in which pop-up screen 202 is displayed in the two regions on the right side of touch panel 15, MFP 100 returns pop-up screen 202 to the two regions on the left side.

When touch operation on pop-up screen 202 is accepted from a user not having operation authority over pop-up screen 202, MFP 100 may make pop-up screen 202 translucent or may hide pop-up screen 202, rather than shifting pop-up screen 202 as described above. The shape of pop-up screen 202 may be changed as described below.

Figure 23:
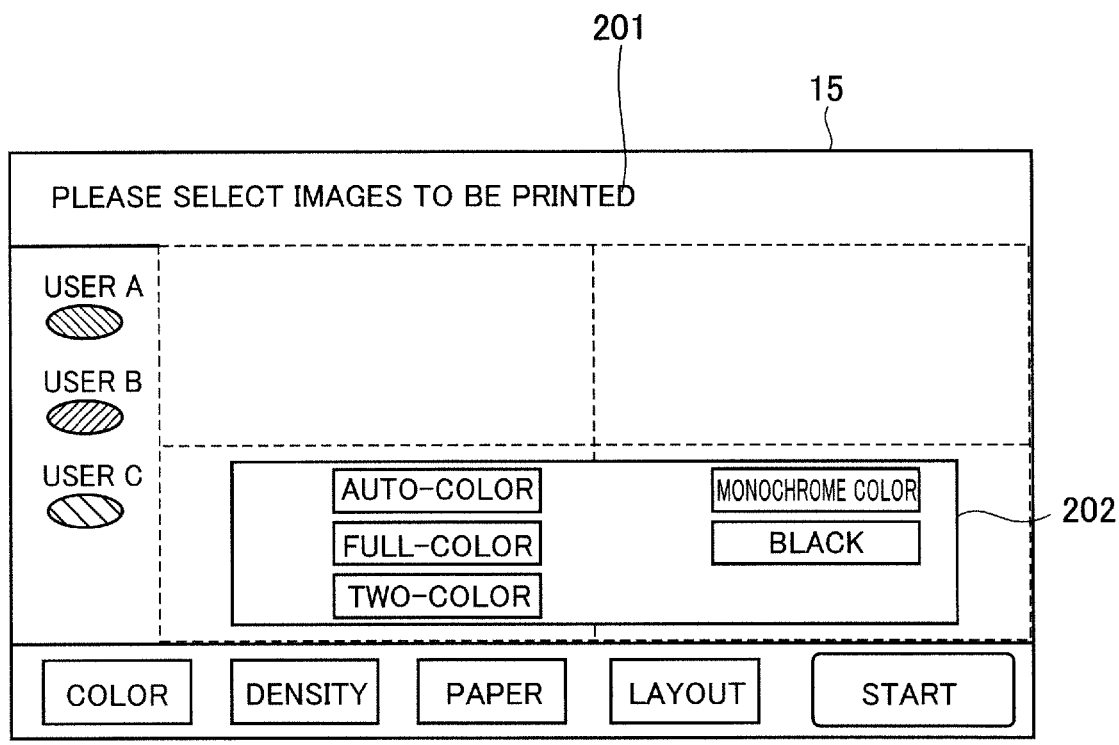
FIG. 23 is a diagram schematically showing another example of pop-up screen 202 with the display state changed.
Figure 24:
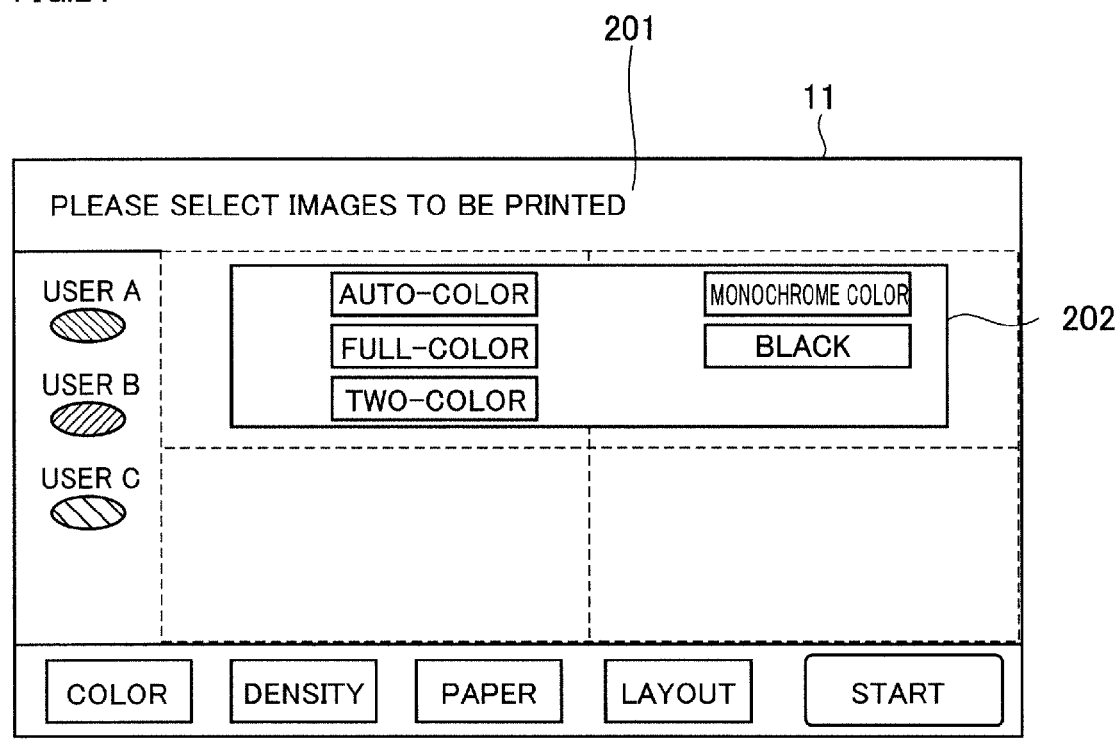
FIG. 24 is a diagram schematically showing yet another example of pop-up screen 202 with the display state changed.

FIG. 23 is a diagram schematically showing another example of pop-up screen 202 with the display state changed. FIG. 24 is a diagram schematically showing yet another example of pop-up screen 202 with the display state changed.

Referring to FIG. 23, when touch operation on pop-up screen 202 is accepted from a user not having operation authority over pop-up screen 202 in the state in which pop-up screen 202 is displayed in the two regions on the left side of touch panel 15, MFP 100 changes pop-up screen 202 from a vertically long shape to a horizontally long shape and displays the changed shape in the two regions on the lower side of touch panel 15 so that the user can easily view the touch operation on base screen 201. Thereafter, when touch operation on pop-up screen 202 is accepted from a user not having operation authority over pop-up screen 202 in the state in which pop-up screen 202 is displayed in the two regions on the lower side of touch panel 15, MFP 100 shifts pop-up screen 202 to the two regions on the upper side as shown in FIG. 24. It is noted that even when the shape of pop-up screen 202 is changed, the contents of the submenu included in pop-up screen 202 are the same as before the change.

Furthermore, when touch operation on the pop-up screen is accepted from a user not having operation authority over the pop-up screen, MFP 100 may shift the pop-up screen and change its shape. For example, in a case where a square pop-up screen is displayed at the center of touch panel 15, when input operation from a user not having operation authority is accepted, MFP 100 changes the shape of the pop-up screen from a square to a rectangle and changes the display position to the upper half region of touch panel 15, so that the portion hidden by the pop-up screen before then is visualized.

Figure 25:
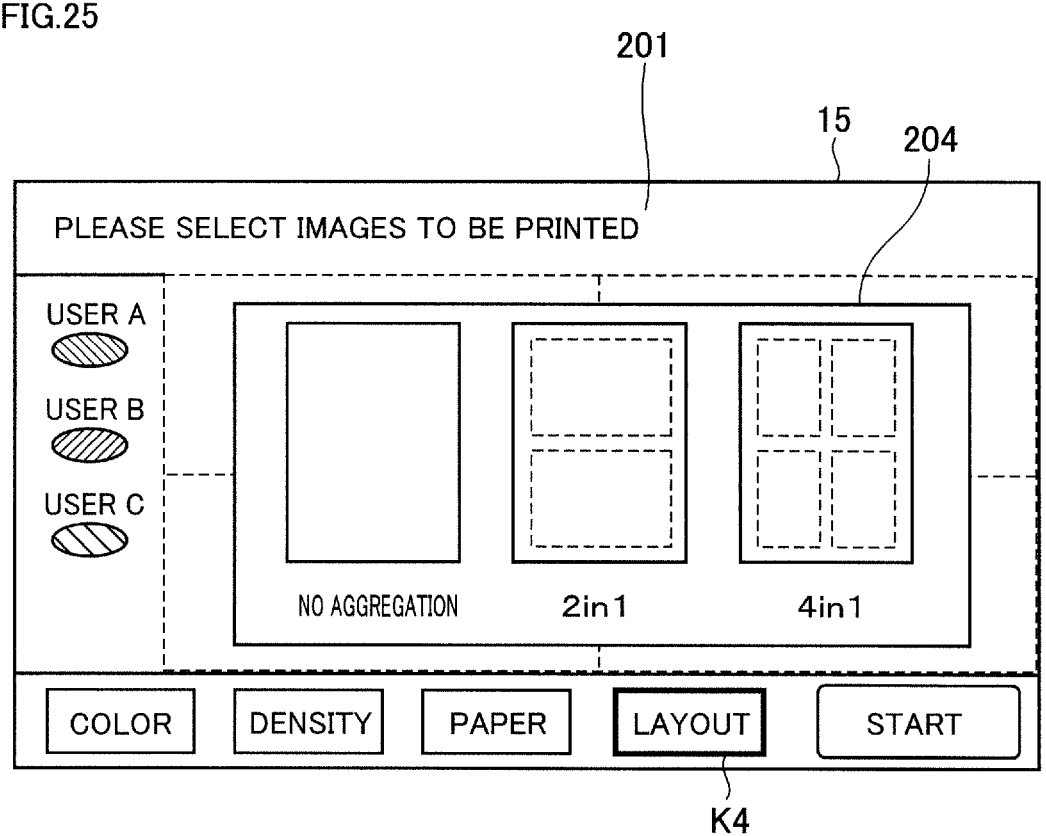
FIG. 25 is a diagram schematically showing a pop-up screen 104 for layout setting displayed on touch panel 15.

FIG. 25 is a diagram schematically showing a pop-up screen for layout setting that is displayed on touch panel 15.

Referring to FIG. 25, when the press of key K4 as a layout setting key is accepted, MFP 100 displays a pop-up screen 204 including a submenu of layout setting on touch panel 15. Pop-up screen 204 for layout setting takes up all the four regions.

Figure 26:
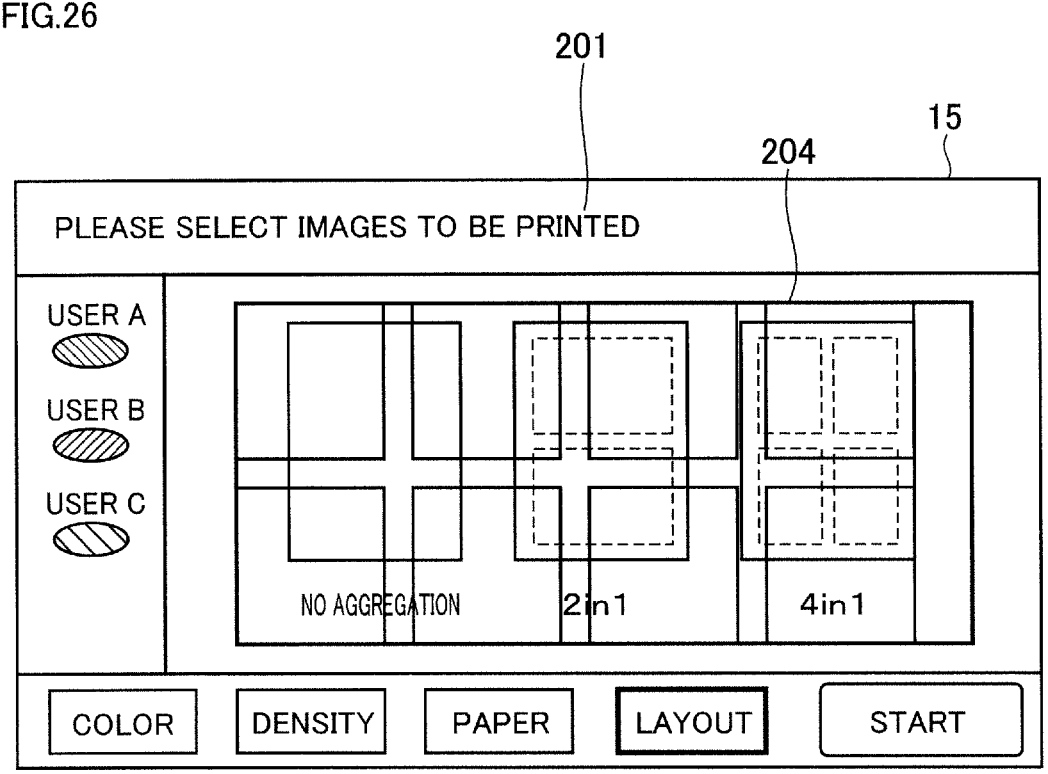
FIG. 26 is a diagram schematically showing an example of a pop-up screen 204 with the display state changed.
Figure 27:
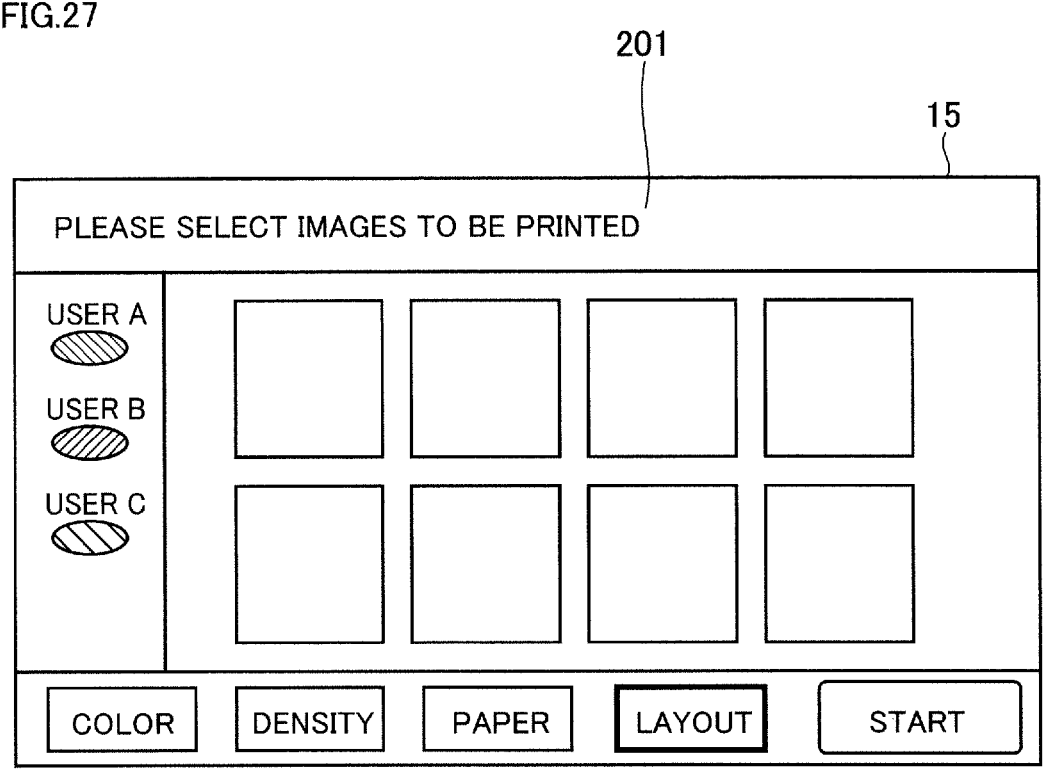
FIG. 27 is a diagram schematically showing another example of pop-up screen 204 with the display state changed.

FIG. 26 is a diagram schematically showing an example of pop-up screen 204 with the display state changed. FIG. 27 is a diagram schematically showing another example of pop-up screen 204 with the display state changed.

Referring to FIG. 26, when touch operation on pop-up screen 204 is accepted from a user not having operation authority over pop-up screen 204, MFP 100 may make pop-up screen 204 translucent as shown in FIG. 26 or may hide (make transparent) pop-up screen 204 as shown in FIG. 27 so that the user can easily view the touch position on base screen 201.

The change in display state of the pop-up screen as described above may be applied only to the case where two layers are being used (where only one pop-up screen is displayed in addition to the base screen). In this case, when, of five layers of touch panel 15, three or more layers are being used, the screen on the highest-level layer and the screen on the lowest-level layer (layer 1) among the layers being used may be displayed normally, whereas the other layers being used may be made transparent or hidden.

A flowchart for changing display of the pop-up screen will now be described.

Figure 28:
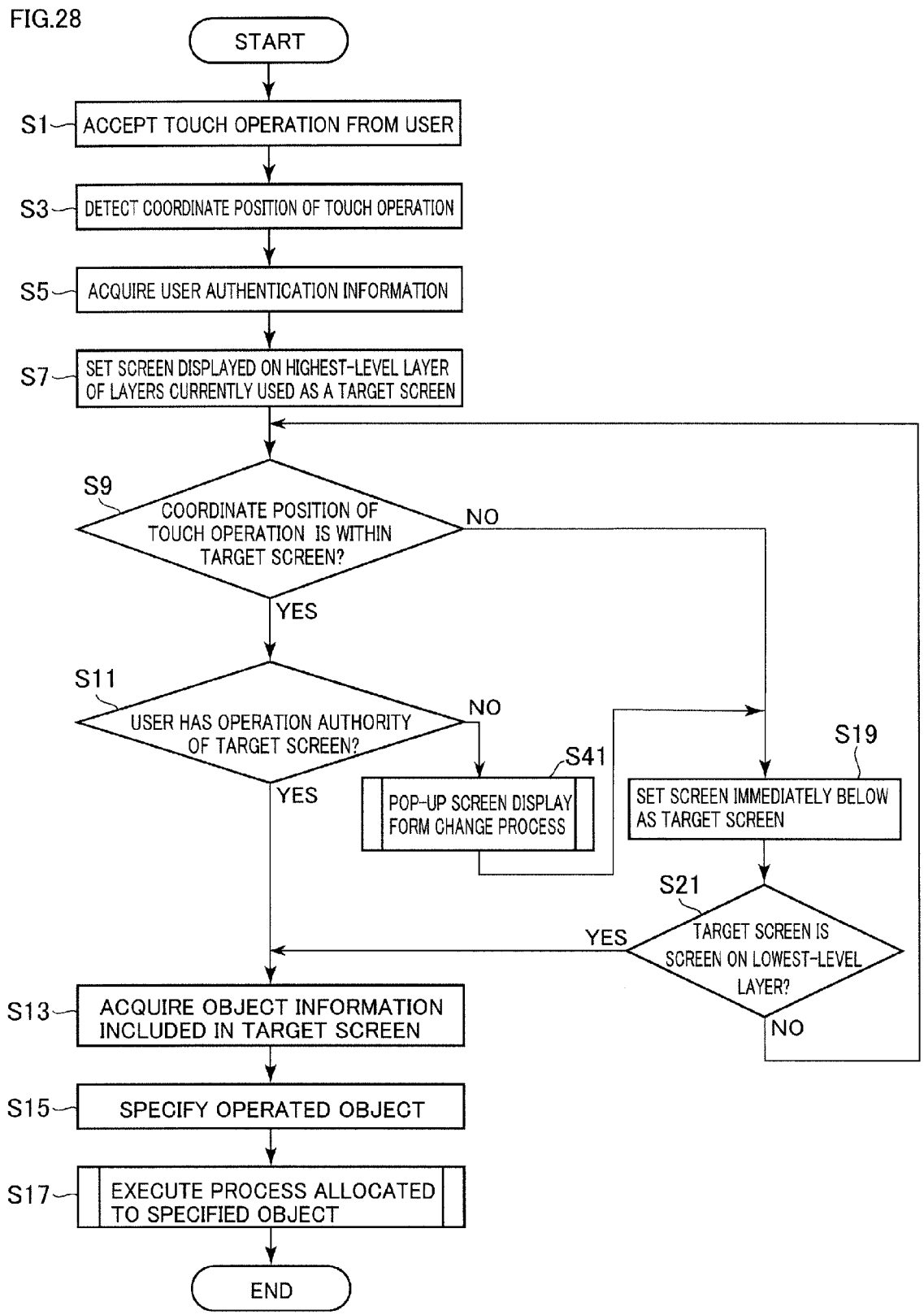
FIG. 28 is a flowchart showing a second modification of the operation of MFP 100 in an embodiment of the present invention.

FIG. 28 is a flowchart showing a second modification of the operation of MFP 100 in an embodiment of the present invention.

Referring to FIG. 28, this flowchart differs from the flowchart shown in FIG. 15 in that the process in step S41 is performed when it is determined that the user does not have operation authority in step S11 (NO in S11). The other process in this modification is the same as the process in the flowchart shown in FIG. 15 and a description is thus not repeated.

In step S41, CPU 1 performs a pop-up screen display form change process described later (S41) and proceeds to the process in step S19.

Figure 29:
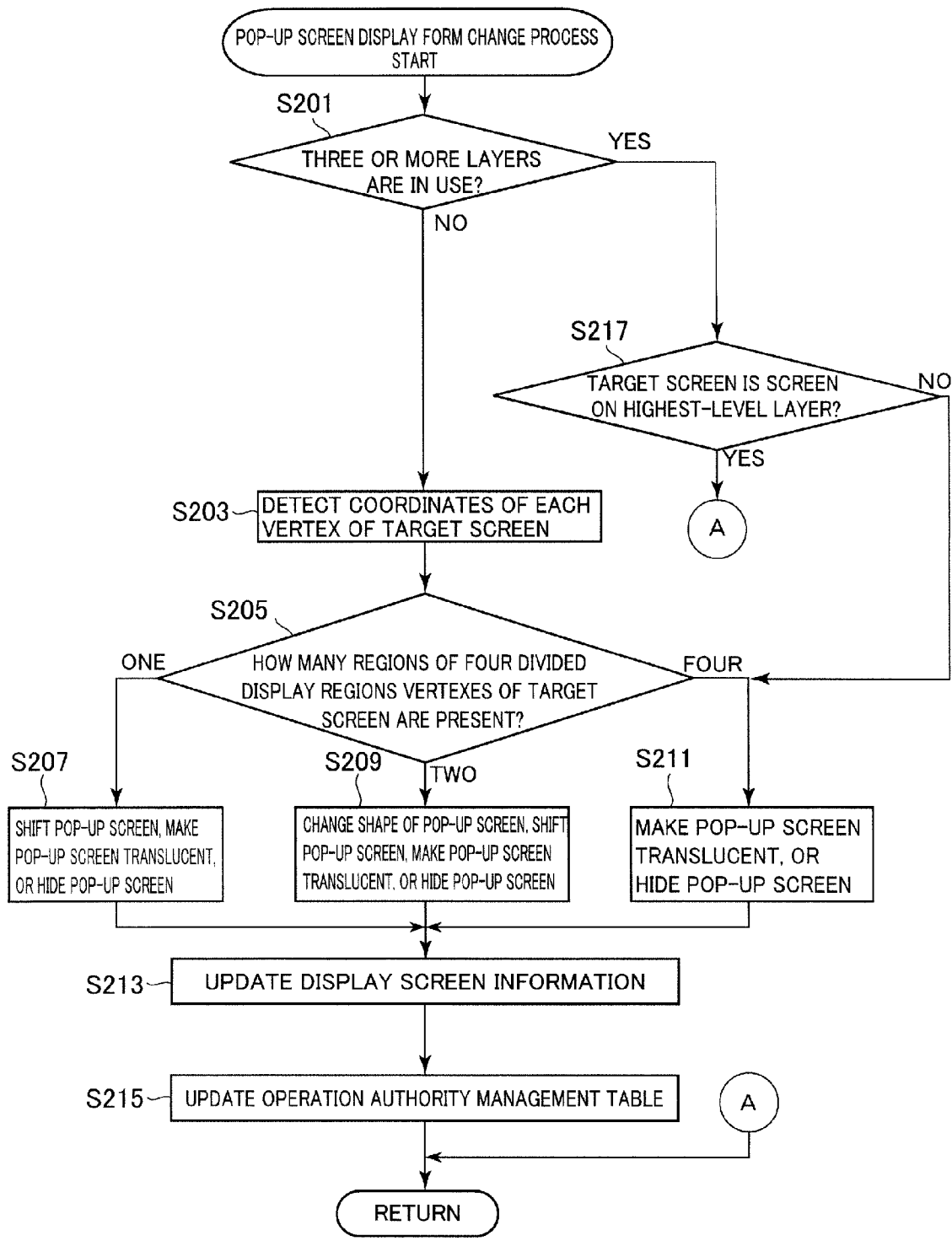
FIG. 29 shows a subroutine of the process in step S41 in FIG. 28.

FIG. 29 is a subroutine of the process in step S41 in FIG. 28.

Referring to FIG. 29, in the pop-up screen display form change process in step S41, CPU 1 determines whether three or more layers are being used by referring to the operation authority management table (S201).

In step S201, if it is determined that three or more layers are not being used (NO in S201), CPU 1 detects the coordinates of each vertex of the target screen (S203) and determines in how many regions of the four divided display regions the vertexes of the target screen are present (S205).

In step S205, if it is determined that the vertexes are present in only one region ("one" in S205), CPU 1 allows display control unit 5 to shift the pop-up screen as the target screen (S207) and proceeds to the process in step S213. In step S207, CPU 1 may make the pop-up screen translucent or hide the pop-up screen, rather than shifting the pop-up screen.

In step S205, if it is determined that the vertexes are present in two regions ("two" in S205), CPU 1 allows display control unit 5 to change the shape of the pop-up screen (S209) and proceeds to the process in step S209. In step S213, CPU 1 may shift the pop-up screen, or make the pop-up screen translucent, or hide the pop-up screen, rather than changing the shape.

In step S205, if it is determined that the vertexes are present in all the four regions ("four" in S205), CPU 1 allows display control unit 5 to make the shape of the pop-up screen translucent (S211) and proceeds to the process in step S213. In step S211, CPU 1 may hide the pop-up screen, rather than making the shape of the pop-up screen translucent.

In step S201, if it is determined that three or more layers are being used (YES in S201), CPU 1 determines whether the target screen is the screen on the highest-level layer of the layers being used (S217).

In step S217, if it is determined that the target screen is on the highest-level layer (YES in S217), CPU 1 returns without changing the display state of the target screen. On the other hand, in step S217, if it is determined that the target screen is not on the highest-level layer (NO in S217), CPU 1 proceeds to the process in step S211 and makes the shape of the pop-up screen translucent or hide the pop-up screen (S211).

In step S213, CPU 1 allows display control unit 5 to update the display screen information as necessary (S213) and allows display control unit 5 to update the operation authority management table (S215). The process then returns.

MFP 100 may reset the translucent pop-up screen to the normal state if touch operation is not accepted from any user continuously for a certain period of time after the display state of the pop-up screen is made translucent by the method above, or if a user not having operation authority over the translucent pop-up screen performs input operation on the screen below the translucent pop-up screen (a screen different from the translucent screen).

The time serving as a basis for determining whether a certain period of time has elapsed may be set in advance by the administrator of MFP 100. The set time is set in a timer (not shown) in MFP 100. While waiting for input operation, MFP 100 counts down the timer, and at a point of time when the count value of the timer becomes zero, an event occurs. On the other hand, if input operation is made, the count value of the timer is reset to an initial value (the time set by the administrator).

A flowchart including a process of resetting the translucent pop-up screen to the normal state will be described below.

Figure 30:
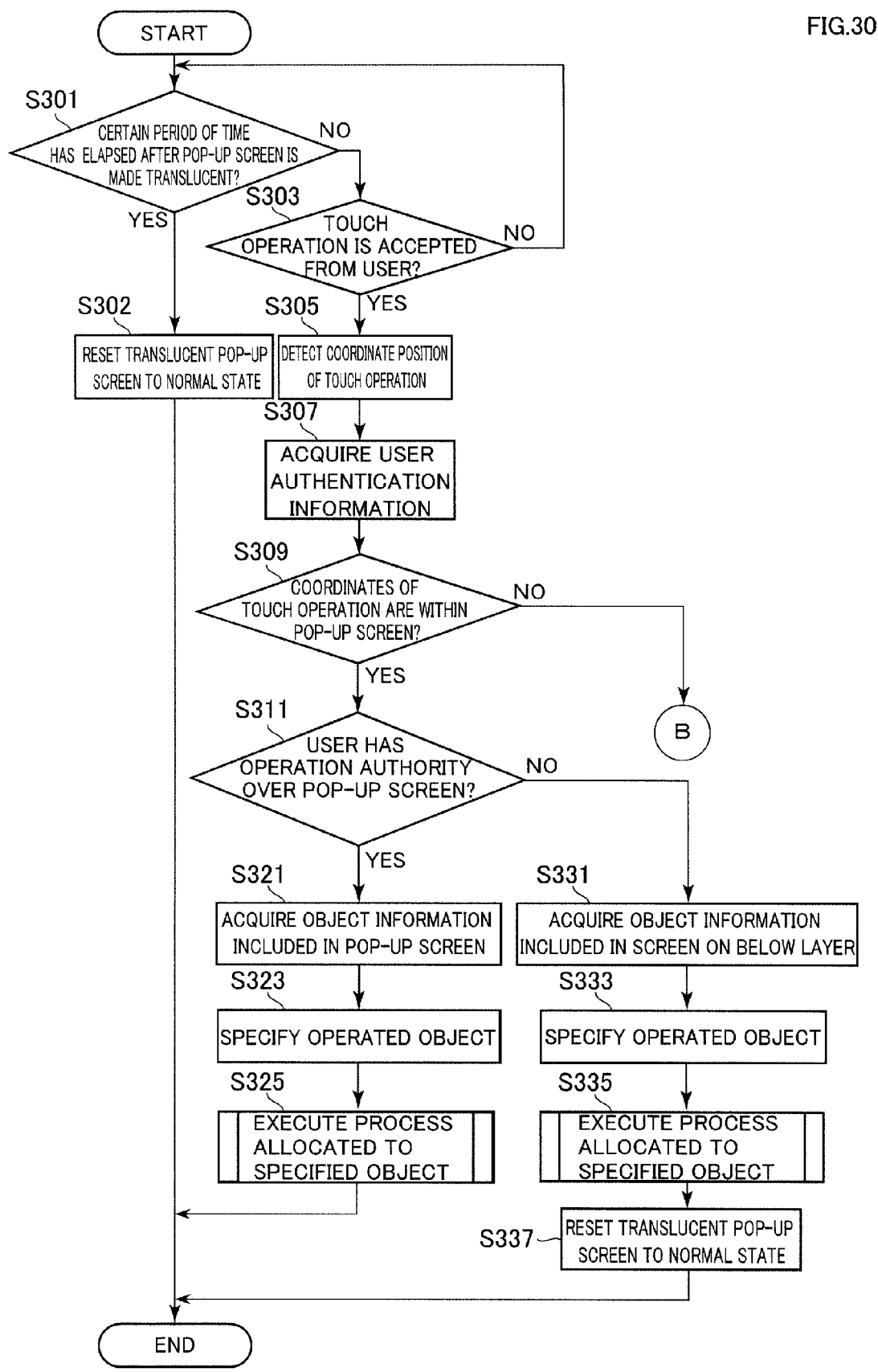
FIGS. 30 and 31 are flowcharts showing a third modification of the operation of MFP 100 in an embodiment of the present invention.
Figure 31:
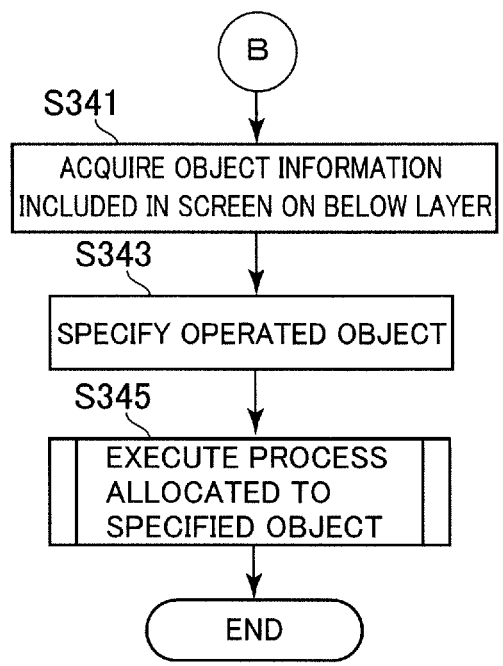

FIG. 30 and FIG. 31 are flowcharts showing a third modification of the operation of MFP 100 in an embodiment of the present invention.

Referring to FIG. 30, CPU 1 determines whether a certain period of time has elapsed after the pop-up screen is made translucent (S301). In step S301, if it is determined that a certain period of time has elapsed (YES in S301), CPU 1 resets the translucent pop-up screen to the normal state (S302). The process then ends. On the other hand, in step S301, if it is determined that a certain period of time has not elapsed (NO in S301), CPU 1 determines whether touch operation is accepted from a user (S303).

In step S303, if it is determined that touch operation is accepted (YES in S303), CPU 1 allows touch panel control unit 6 to detect the coordinate position of the touch operation on touch panel 15 (S305) and proceeds to the process in step S307. On the other hand, in step S303, if it is determined that touch operation is not accepted (NO in S303), CPU 1 proceeds to the process in step S301.

In step S307, CPU 1 allows authentication control unit 4 to acquire the user authentication information from the user's body area network device and specifies the user who performs touch operation (S307). CPU 1 then determines whether the coordinates of the touch operation are within the pop-up screen (S309). In step S309, if it is determined that the coordinates of the touch position are within the pop-up screen (YES in S309), CPU 1 determines whether the user who performs touch operation has operation authority over the target screen (S311). On the other hand, in step S309, if it is determined that the coordinates of the touch position are not within the pop-up screen (NO in S309), CPU 1 proceeds to the process in step S341 in FIG. 31.

In step S311, if it is determined that the user has operation authority over the target screen (YES in S311), CPU 1 acquires object information included in the pop-up screen from the display screen information (S321) and specifies the operated object (S323). CPU 1 then executes a process allocated to the specified object shown in FIG. 16 (S325) and terminates the process.

In step S311, if it is determined that the user does not have operation authority over the target screen (NO in S311), CPU 1 acquires object information included in the screen on the layer below the pop-up screen from the display screen information (S331) and specifies the operated object (S333). CPU 1 then executes a process allocated to the specified object shown in FIG. 16 (S335) and allows display control unit 5 to reset the pop-up screen to the normal state (S337). The process then ends.

Referring to FIG. 31, in step S341, CPU 1 acquires object information included in the screen on the layer below the pop-up screen from the display screen information (S341) and specifies the operated object (S343). CPU 1 then executes a process allocated to the specified object shown in FIG. 16 (S345) and terminates the process.

MFP 100 may reset the hidden pop-up screen to the normal state if touch operation is not accepted from any user continuously for a certain period of time or longer after the pop-up screen is hidden by the method above, or if touch operation is accepted from any user irrespective of whether the user has operation authority.

The flowchart including the process of resetting the hidden pop-up screen to the normal state will be described below.

Figure 32:
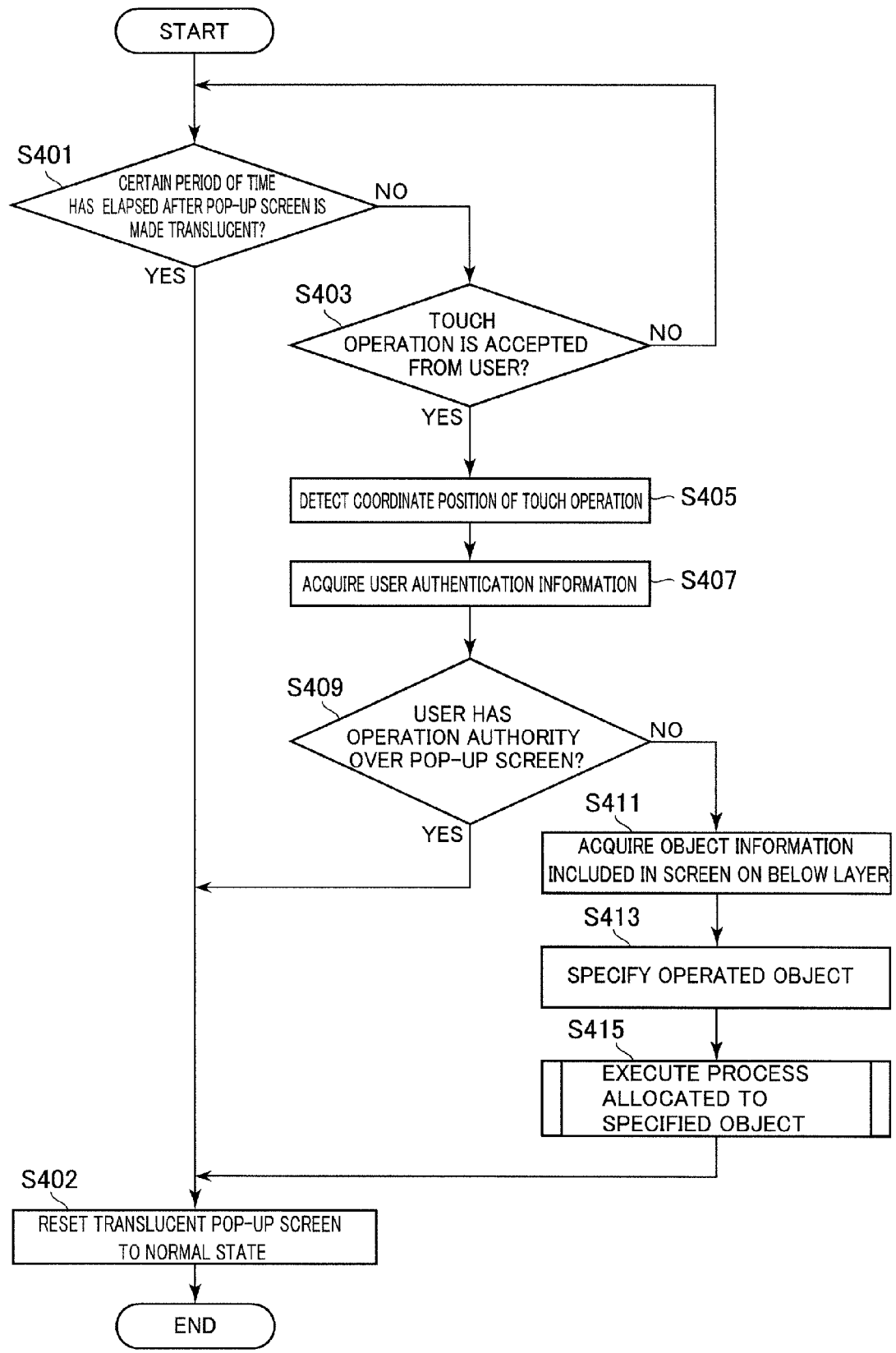
FIG. 32 is a flowchart showing a fourth modification of the operation of MFP 100 in an embodiment of the present invention.

FIG. 32 is a flowchart showing a fourth modification of the operation of MFP 100 in an embodiment of the present invention.

Referring to FIG. 32, CPU 1 determines whether a certain period of time has elapsed after the pop-up screen is hidden (S401). In step S401, if it is determined that a certain period of time has elapsed (YES in S401), CPU 1 allows display control unit 5 to reset the hidden pop-up screen to the normal state (S402) and terminates the process. On the other hand, in step S401, if it is determined that a certain period of time has not elapsed (NO in S401), CPU 1 determines whether touch operation is accepted from a user (S403).

In step S403, if it is determined that touch operation is accepted (YES in S403), CPU 1 allows touch panel control unit 6 to detect the coordinate positions of touch operation on touch panel 15 (S405) and proceeds to the process in step S407. On the other hand, in step S403, if it is determined that touch operation is not accepted (NO in S403), CPU 1 proceeds to the process in step S401.

In step S407, CPU 1 allows authentication control unit 4 to acquire user authentication information from the user's body area network device and specifies the user who performs touch operation (S407). CPU 1 then determines whether the user who performs touch operation has operation authority over the target screen (S409). In step S409, if it is determined that the user has operation authority (YES in S409), CPU 1 proceeds to the process in step S402.

In step S409, if it is determined that the user does not have operation authority (NO in S409), CPU 1 acquires object information included in the screen on the layer below the pop-up screen from the display screen information (S411) and specifies the operated object (S413). CPU 1 then executes a process allocated to the specified object shown in FIG. 16 (S415) and proceeds to the process in step S402.

[Effects of Embodiments]

According to the foregoing embodiments, a display device with improved operability can be provided.

According to the foregoing embodiments, when a user performs operation to display a pop-up screen and allows the pop-up screen to appear, the user who performs the operation can perform operation on the pop-up screen, while other users not having operation authority over the pop-up screen can also perform input operation on a screen being displayed below the pop-up screen. As a result, users do not have to stop their jobs halfway, thereby improving working efficiency.

In the case where input operation from a user not having operation authority over any of the layers being used is discarded (invalidated), an operating error by the user not having operation authority can be prevented.

In the case where a new pop-up screen is displayed translucently, when a user not having operation authority over the pop-up screen performs input operation on the screen on the layer one level below the pop-up screen, the visibility of information on the screen can be improved, so that the user can perform input operation even more easily.

In the case where the display form of the screen over which the user does not have operation authority is dynamically changed when a new pop-up screen is displayed, the screen can be displayed according to the user's operating conditions.

In the case where a pop-up screen is shifted, changed in shape, made translucent, or hidden when a user not having operation authority over the pop-up screen attempts to operate a screen on the layer below the pop-up screen, the visibility of the portion hidden under the pop-up screen can be improved. As a result, input operation can be further facilitated at a timing desired by the user.

In the flowcharts shown in FIG. 30 to FIG. 32, when input operation is accepted from the user not having operation authority over a pop-up screen after the pop-up screen is made translucent or hidden, MFP 100 determines that the operation request by a user not having operation authority is temporarily satisfied. MFP 100 thereafter resets the pop-up screen to the normal display in order to give priority to operation by the user having operation authority over the pop-up screen. Accordingly, reduction in operability can be prevented even for the user having operation authority over the pop-up screen.

In the flowcharts shown in FIG. 30 to FIG. 32, when a certain period of time has elapsed without accepting input operation from any user after the pop-up screen is made translucent or hidden, MFP 100 determines that there is still time before a user not having operation authority over the pop-up screen performs input operation. MFP 100 then gives priority to the user having operation authority over the pop-up screen and thereafter resets the pop-up screen to the normal display. As a result, reduction in operability can be prevented even for the user having operation authority over the pop-up screen.

[Others]

The display device may be any device that has a function of identifying the user who performs the accepted operation.

Users may be identified by a method other than the method using the body area network function. For example, the display device may store a table showing the relation between fingerprints and users, analyze the image of the fingerprint of the user who operates the touch panel of the display device, and identify the user based on the table.

Although a pop-up type screen is displayed on a base screen in the foregoing embodiments, the screen displayed on the base screen may not be a pop-up type screen and may be displayed on the entire screen.

The foregoing embodiments may be combined as appropriate. For example, it is possible to combine the embodiment (the first modification) in which touch operation accepted from the user not having operation authority over any layer is discarded, with the embodiment (the second to fourth modifications) in which the display state of the pop-up screen is changed when touch operation on the pop-up screen is accepted from the user not having operation authority.

The process in the foregoing embodiments may be performed by software or may be performed using hardware circuitry. A program that executes the process in the foregoing embodiments may be provided. A recording medium such as a CD-ROM, a flexible disk, a hard disk, a ROM, a RAM, or a memory card encoded with the program may be provided to users. The program may be downloaded to the device through a communication circuit such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display device with a touch panel for displaying a variety of information, comprising:
    a screen display unit for displaying a plurality of screens overlapping one another on the touch panel;
    an operation accepting unit for accepting operation on any one of the plurality of screens displayed on the screen display unit;
    an identification unit for identifying a user who performs the operation accepted by the operation accepting unit; and
    a screen specifying unit wherein if the user identified by the identification unit does not have operation authority over a first screen on a highest-level of the plurality of screens, the screen specifying unit does not specify the first screen as a screen serving as a target of the operation accepted by the operation accepting unit but specifies a second screen on a highest level of screens over which the user identified by the identification unit has operation authority, among the plurality of screens, as a screen serving as a target of the operation accepted by the operation accepting unit.

2. The display device according to claim 1, further comprising a storage unit for storing users who have operation authority over each of the plurality of screens displayed on the screen display unit,
    wherein the screen specifying unit specifies a screen based on whether the user identified by the identification unit is included in the users stored in the storage unit.

3. The display device according to claim 1, further comprising an operation authority granting unit for granting operation authority over a new screen to the user identified by the identification unit when operation involving display of a new screen is accepted by the operation accepting unit.

4. The display device according to claim 1, wherein the identification unit includes a body area network unit for receiving identification information from a body area network device held by a user through a human body of the user who performs operation accepted by the operation accepting unit.

5. The display device according to claim 1, further comprising an operation discarding unit for discarding operation accepted by the operation accepting unit when the user identified by the identification unit does not have operation authority over any of the plurality of screens displayed on the screen display unit.

6. The display device according to claim 1, further comprising a new screen display unit for displaying a new screen through operation accepted by the operation accepting unit.

7. The display device according to claim 6, wherein the new screen display unit displays a new screen translucently.

8. The display device according to claim 1, further comprising a display state changing unit for changing a display state of a screen over which the user identified by the identification unit does not have operation authority, among the plurality of screens displayed by the screen display unit.

9. The display device according to claim 8, wherein the display state changing unit includes a display position shifting unit for shifting a display position of a screen over which the user identified by the identification unit does not have operation authority.

10. The display device according to claim 8, wherein the display state changing unit includes a screen shape changing unit for changing a shape of a screen over which the user identified by the identification unit does not have operation authority.

11. The display device according to claim 8, wherein the display state changing unit includes a translucency unit for making translucent a screen over which the user identified by the identification unit does not have operation authority.

12. The display device according to claim 11, further comprising a first change clearing unit for resetting a display state of a screen made translucent by the translucency unit to an original state when the operation accepting unit accepts operation on a screen different from the screen made translucent by the translucency unit after the screen is made translucent by the translucency unit.

13. The display device according to claim 8, wherein the display state changing unit includes a hiding unit for hiding a screen over which the user identified by the identification unit does not have operation authority.

14. The display device according to claim 13, further comprising a second change clearing unit for resetting a display state of a screen hidden by the hiding unit to an original state when the operation accepting unit accepts operation after the screen is hidden by the hiding unit.

15. The display device according to claim 8, further comprising a third change clearing unit for resetting a display state changed by the display state changing unit to an original state when a predetermined time has elapsed in a state in which the operation accepting unit does not accept operation after the display state changing unit changes the display state of the screen.

16. A method of controlling a display device with a touch panel for displaying a variety of information, comprising:
    displaying a plurality of screens overlapping one another on the touch panel;
    accepting operation on any one of the plurality of screens displayed while displaying the plurality of screens;
    identifying a user who performs the operation accepted while accepting the operation; and
    if the user identified while identifying the user does not have operation authority over a first screen on a highest level of the plurality of screens, not specifying the first screen as a screen serving as a target of the operation accepted while accepting the operation, but specifying a second screen on a highest level of screens over which the user identified while identifying the user has operation authority, among the plurality of screens, as a screen serving as a target of the operation accepted while accepting the operation.

17. The method according to claim 16, further comprising storing users who have operation authority over each of the plurality of screens displayed while displaying the plurality of screens,
   wherein while specifying the second screen, a screen is specified based on whether the user identified while identifying the user is included in the users stored while storing the users.

18. A non-transitory computer-readable recording medium encoded with a program for controlling a display device with a touch panel for displaying a variety of information, the program causing a computer to execute processing comprising:
   displaying a plurality of screens overlapping one another on the touch panel;
   accepting operation on any one of the plurality of screens displayed while displaying the plurality of screens;
   identifying a user who performs the operation accepted while accepting the operation; and
   if the user identified while identifying the user does not have operation authority over a first screen on a highest level of the plurality of screens, not specifying the first screen as a screen serving as a target of the operation accepted while accepting the operation, but specifying a second screen on a highest level of screens over which the user identified while identifying the user has operation authority, among the plurality of screens, as a screen serving as a target of the operation accepted while accepting the operation.

19. The recording medium according to claim 18, the program causing a computer to execute processing further comprising storing users who have operation authority over each of the plurality of screens displayed while displaying the plurality of screens,
   wherein while specifying the second screen, a screen is specified based on whether the user identified while identifying the user is included in the users stored in while storing the users.

* * * * *